United States Patent
Mundkur et al.

(10) Patent No.: US 10,789,199 B2
(45) Date of Patent: Sep. 29, 2020

(54) NETWORK TRAFFIC RATE LIMITING IN COMPUTING SYSTEMS

(71) Applicant: Microsoft Technology Licensing, LLC, Redmond, WA (US)

(72) Inventors: Sambhrama Mundkur, Sammamish, WA (US); Fengfen Liu, Sammamish, WA (US); Norman Lam, Sammamish, WA (US); Andrew Putnam, Seattle, WA (US); Somesh Chaturmohta, Redmond, WA (US); Daniel Firestone, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 49 days.

(21) Appl. No.: 15/907,546

(22) Filed: Feb. 28, 2018

(65) Prior Publication Data
US 2019/0081899 A1  Mar. 14, 2019

Related U.S. Application Data

(60) Provisional application No. 62/558,827, filed on Sep. 14, 2017.

(51) Int. Cl.
*H04L 12/801* (2013.01)
*G06F 15/173* (2006.01)
(Continued)

(52) U.S. Cl.
CPC .... *G06F 15/17331* (2013.01); *G06F 9/45533* (2013.01); *G06F 9/45558* (2013.01);
(Continued)

(58) Field of Classification Search
CPC ... H04L 47/193; H04L 49/354; H04L 47/822; H04L 49/3045; H04L 49/9068; H04L 45/24
See application file for complete search history.

(56) References Cited

U.S. PATENT DOCUMENTS 9,729,442 B1    8/2017  Stark et al.
2009/0221292 A1*  9/2009  Lundh ............... H04L 47/10
                                          455/445
(Continued)

FOREIGN PATENT DOCUMENTS

CN    106845381 A    6/2017

OTHER PUBLICATIONS

"Non Final Office Action Issued in U.S. Appl. No. 15/824,914", dated May 16, 2019, 8 Pages.
(Continued)

*Primary Examiner* — Anez C Ebrahim
(74) *Attorney, Agent, or Firm* — Liang IP, PLLC

(57) ABSTRACT

Distributed computing systems, devices, and associated methods of packet routing are disclosed herein. In one embodiment, a computing device includes a field programmable gate array ("FPGA") that includes an inbound processing path and outbound processing path in opposite processing directions. The inbound processing path can forward a packet received from the computer network to a buffer on the FPGA instead of the NIC. The outbound processing path includes an outbound multiplexer having a rate limiter circuit that only forwards the received packet from the buffer back to the computer network when a virtual port corresponding to the packet has sufficient transmission allowance. The outbound multiplexer can also periodically increment the transmission allowance based on a target bandwidth for the virtual port.

20 Claims, 12 Drawing Sheets

(51) Int. Cl.

| | | |
|---|---|---|
| H04L 29/06 | (2006.01) | |
| G06F 9/455 | (2018.01) | |
| G06F 15/76 | (2006.01) | |
| H04L 12/813 | (2013.01) | |
| H04L 12/935 | (2013.01) | |
| H04L 12/931 | (2013.01) | |
| H04L 12/46 | (2006.01) | |
| H04L 12/911 | (2013.01) | |
| H04L 12/861 | (2013.01) | |
| H04L 12/707 | (2013.01) | |
| H04L 12/721 | (2013.01) | |
| H04L 12/717 | (2013.01) | |
| H04L 12/741 | (2013.01) | |
| H04L 29/08 | (2006.01) | |

(52) U.S. Cl.
CPC .......... *G06F 15/76* (2013.01); *H04L 12/4641* (2013.01); *H04L 45/24* (2013.01); *H04L 45/38* (2013.01); *H04L 45/42* (2013.01); *H04L 45/54* (2013.01); *H04L 47/193* (2013.01); *H04L 47/20* (2013.01); *H04L 47/34* (2013.01); *H04L 47/39* (2013.01); *H04L 47/741* (2013.01); *H04L 47/822* (2013.01); *H04L 49/3027* (2013.01); *H04L 49/3045* (2013.01); *H04L 49/354* (2013.01); *H04L 49/9068* (2013.01); *H04L 69/12* (2013.01); *H04L 69/22* (2013.01); *G06F 2009/45583* (2013.01); *G06F 2009/45595* (2013.01); *H04L 49/70* (2013.01); *H04L 67/10* (2013.01); *H04L 67/1097* (2013.01); *H04L 69/161* (2013.01)

(56) References Cited

U.S. PATENT DOCUMENTS

| | | | | |
|---|---|---|---|---|
| 2009/0318088 | A1* | 12/2009 | Wu | H04B 7/0697 455/63.4 |
| 2012/0260296 | A1* | 10/2012 | Mallet | H04W 76/15 725/62 |
| 2013/0058357 | A1 | 3/2013 | Koponen et al. | |
| 2013/0148668 | A1 | 6/2013 | Kean et al. | |
| 2014/0269724 | A1 | 9/2014 | Mehler et al. | |
| 2014/0297775 | A1 | 10/2014 | Davda et al. | |
| 2016/0188527 | A1 | 6/2016 | Cherian et al. | |
| 2016/0285744 | A1 | 9/2016 | Panchagnula et al. | |
| 2017/0034268 | A1 | 2/2017 | Govind | |
| 2017/0041209 | A1 | 2/2017 | Joshi et al. | |
| 2017/0093732 | A1 | 3/2017 | Akhavain Mohammadi | |
| 2017/0230284 | A1 | 8/2017 | Yamashita et al. | |
| 2017/0371835 | A1 | 12/2017 | Ranadive et al. | |
| 2019/0079897 | A1 | 3/2019 | Kochevar-Cureton et al. | |
| 2019/0081891 | A1 | 3/2019 | Mundkur et al. | |

OTHER PUBLICATIONS

"Notice of Allowance Issued in U.S. Appl. No. 15/824,925", dated Aug. 5, 2019, 9 Pages.
Weinzaepfel, et al., "Learning to Track for Spatio-Temporal Action Localization", In Proceedings of the IEEE International Conference on Computer Vision, Dec. 7, 2015, pp. 3164-3172.
Carlos, Guestrin, et al., "Dimensionality Reduction PCA", Retrieved From: https://courses.cs.washington.edu/courses/csep546/14wi/slides/pca-neuralnets-annotated.pdf, Feb. 18, 2014, 62 Pages.
Firestone, Daniel, "VFP: A Virtual Switch Platform for Host SDN in the Public Cloud", In Proceedings of 14th USENIX Symposium on Networked Systems Design and Implementation, Mar. 27, 2017, pp. 315-328.
"International Search Report and Written Opinion Issued in PCT Application No. PCT/US2018/038874", dated Sep. 27, 2018, 13 Pages.
"International Search Report & Written Opinion Issued in PCT Application No. PCT/US20181039637", dated Sep. 10, 2018, 13 Pages.
"International Search Report & Written Opinion Issued in PCT Application No. PCT/US2018/039638", dated Sep. 10, 2018, 13 Pages.
"International Search Report & Written Opinion Issued in PCT Application No. PCT/US2018/039640", dated Sep. 10, 2018, 12 Pages.
Shao, et al., "Slicing Convolutional Neural Network for Crowd Video Understanding", In Proceedings of the IEEE Conference on Computer Vision and Pattern Recognition, Jun. 27, 2016, pp. 5620-5628.
Tonsing, Johann, "OVS Acceleration Using Network Flow Processors", Retrieved From: http://www.openvswitch.org/support/ovscon2014/18/1300-ovs-accel-nfp-2014-11-18.pdf, Nov. 18, 2014, 23 Pages.
"Notice Of Allowance Issued In U.S. Appl. No. 15/824,914", dated Dec. 4, 2019, 8 Pages.
Auduno, "DeepDraw", Retrieved From: https://github.com/auduno/deepdraw, Jun. 19, 2016, 2 Pages.
Derpanis, et al., "Dynamic Scene Understanding: The Role of Orientation Features in Space and Time in Scene classification", in Proceedings of IEEE Conference on Computer Vision and Pattern Recognition, Jun. 16, 2012, pp. 1306-1313.
Feichtenhofer, et al., "Bags of Space-time Energies for Dynamic Scene Recognition", In Proceedings of the IEEE conference on Computer Vision and Pattern Recognition, Jun. 23, 2014, pp. 2681-2688.
Feichtenhofer, et al., "Convolutional Two-Stream Network Fusion for Video Action Recognition", In Proceedings of the IEEE Conference on Computer Vision and Pattern Recognition, Jun. 27, 2016, pp. 1933-1941.
He, et al., "Deep Residual Learning for Image Recognition", In Proceedings of the IEEE Conference on Computer Vision and Pattern Recognition, Jun. 27, 2016, pp. 770-778.
Heilbron, et al., "Activitynet: A large-scale Video Benchmark for Human Activity Understanding", In Proceedings of be IEEE Conference on Computer Vision and Pattern Recognition, Jun. 7, 2015, pp. 961-970.
Ji, et al., "3D Convolutional Neural Networks for Human Action Recognition", In Journal of IEEE Transactions on Pattern Analysis and Machine Intelligence, vol. 35, Issue 1, Jan. 2013, pp. 221-231.
Karpathy, et al., "Large-Scale Video Classification with Convolutional Neural Networks", In Proceedings of IEEE conference on Computer Vision and Pattern Recognition, Jun. 23, 2014, pp. 1725-1732.
Klaser, et al., "A Spatio-Temporal Descriptor Based on 3D-Gradients", In Proceedings of the British Machine Vision conference, Sep. 1, 2008, 10 pages.
Kliper-Gross, et al., "Motion Interchange Patterns for Action Recognition in Unconstrained Videos", In Proceedings of European Conference on Computer Vision, Oct. 7, 2012, pp. 256-269.
Kliper-Gross, et al., "The Action Similarity Labeling Challenge", In Journal of IEEE Transactions on Pattern Analysis and Machine Intelligence, vol. 34 , Issue 3, Mar. 2012, pp. 615-621.
Krizhevsky, et al., "ImageNet Classification with Deep Convolutional Neural Networks", In Proceedings of 26th Annual Conference on Neural Information Processing Systems, Dec. 3, 2012, 9 Pages.
Laptev, et al , "Learning Realistic Human Actions from Movies", In Proceedings of IEEE Conference on Computer Vision and Pattern Recognition, Jun. 23, 2008, 8 Pages.
Laptev, Ivan, "On Space-Time Interest Points", Published in International Journal of Computer Vision, vol. 64, Issue 2-3, Jun. 2005, pp. 107-123.
Maaten, et al., "Visualizing Data Using t-SNE", In Journal of Machine Learning Research, vol. 9, Nov. 2008, pp. 2579-2605.
Ng, et al., "Beyond Short Snippets: Deep Networks for Video Classification", In Proceedings of IEEE Conference on computer Vision and Pattern Recognition, Jun. 7, 2015, pp. 4694-4702.

(56) References Cited

OTHER PUBLICATIONS

Peng, et al., "Large Margin Dimensionality Reduction for Action Similarity Labeling", In Journal of IEEE Signal Processing Letters, vol. 21 , Issue 8, Aug. 2014, pp. 1022-1025.

Perronnin, et al., "Improving the Fisher Kernel for Large-Scale Image Classification", In Proceedings of European conference on Computer Vision, Sep. 5, 2010, pp. 143-156.

Qiu, et al., "Learning Spatio-Temporal Representation with Pseudo-3D Residual Networks", In Proceedings of the IEEE International Conference on Computer Vision, Oct. 22, 2017, pp. 5534-5542.

Scovanner, et al., "A 3-Dimensional Sift Descriptor and its Application to Action Recognition", In Proceedings of be 15th ACM International Conference on Multimedia, Sep. 23, 2007, pp. 357-360.

Shroff, et al., "Moving Vistas: Exploiting Motion for Describing Scenes", In Proceedings of IEEE Computer Society conference on Computer Vision and Pattern Recognition, Jun. 13, 2010, pp. 1911-1918.

Simonyan, et al., "Two-Stream Convolutional Networks for Action Recognition in Videos", In Proceedings of Annual conference on Neural Information Processing Systems, Dec. 8, 2014, 9 pages.

Simonyan, et al., "Very Deep Convolutional Networks for Large-Scale Image Recognition", In Proceedings of 3rd International Conference on Learning Representations, May 7, 2015, 14 Pages.

Soomro, et al., "UCF101: A Dataset of 101 Human Actions Classes from Videos in the Wild", In Technical Report of 2,enter for Research in Computer Vision-TR-12-01, Nov. 2012, 7 pages.

Srivastava, et al., "Unsupervised Learning of Video Representations Using LSTMs", In Proceedings of 32nd International Conference on Machine Learning, Jul. 6, 2015, 10 pages.

Sun, et al., "Human Action Recognition using Factorized Spatio-Temporal Convolutional Networks", In Proceedings of be IEEE International Conference on Computer Vision, Dec. 7, 2015, pp. 4597-4605.

Szegedy, et al., "Going Deeper with Convolutions", In Proceedings of IEEE Conference on Computer Vision and Pattern Recognition, Jun. 7, 2015, 9 pages.

Theriault, et al., "Dynamic Scene Classification: Learning Motion Descriptors with Slow Features Analysis", In Proceedings of IEEE Conference on Computer Vision and Pattern Recognition, Jun. 23, 2013, 8 pages.

Tran, et al., "Learning Spatiotemporal Features with 3D Convolutional Networks", In Proceedings of IEEE International Conference on Computer Vision, Dec. 7, 2015, pp. 4489-4497.

Varol, et al., "Long-Term Temporal Convolutions for Action Recognition", In Composite Repository of arXiv:1604.04494v1, Apr. 15, 2016, 18 Pages.

Wang, et al., "Action Recognition by Dense Trajectories", In Proceedings of Conference on Computer Vision and Pattern Recognition, Jun. 20, 2011, pp. 3169-3176.

Wang, et al., "Action Recognition with Improved Trajectories", In Proceedings of the IEEE International Conference pn Computer Vision, Dec. 1, 2013, 8 pages.

Wang, et al., "Action Recognition with Trajectory-Pooled Deep-Convolutional Descriptors", In Proceedings of IEEE conference on Computer Vision and Pattern Recognition, Jun. 7, 2015, pp. 4305-4314.

Wang, et al., "Temporal Segment Networks: Towards Good Practices for Deep Action Recognition", In Proceedings of 14th European Conference on Computer Vision, Oct. 11, 2016, 16 Pages.

Willems, et al., "An Efficient Dense and Scale-Invariant Spatio-Temporal Interest Point Detector", In Proceedings of 10th European Conference on Computer Vision, Oct. 12, 2008, 14 Pages.

Zhang et al., "Polynet: a Pursuit of Structural Diversity in Very Deep Networks", In Compository Reposit of arXiv:1611.05725v1, Nov. 17, 2016, 9 pages.

Zhu et al., "A Key Volume Mining Deep Framework for Action Recognition", In Proceedings of IEEE Conference on Computer Vision and Pattern Recognition, Jun. 27, 2016, pp. 1991-1999.

* cited by examiner

NETWORK TRAFFIC RATE LIMITING IN COMPUTING SYSTEMS

CROSS-REFERENCE TO RELATED APPLICATION(S)

This application is a Non-provisional application of and claims priority to U.S. Provisional Application No. 62/558,827, filed on Sep. 14, 2017.

BACKGROUND

Distributed computing systems typically include routers, switches, bridges, and other physical network devices that interconnect large numbers of servers, network storage devices, or other types of computing devices. The individual servers can host one or more virtual machines ("VMs"), virtual switches, or other types of virtualized functions. The virtual machines can facilitate execution of suitable applications for individual users to provide to the users desired cloud services or other suitable types of computing services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In cloud-based datacenters or other large scale distributed computing systems, overlay protocols such as Virtual Extensible LAN and virtual switching can involve complex packet manipulation actions. As such, processing complexity related to server-based networking data plane has increased dramatically to support such overlay protocols. With ever increasing network interface bandwidths, performing these complex packet manipulation actions in software imposes a heavy burden on processing resources at the servers to leave little or no processing resources to run user applications.

To address such challenges, certain hardware circuitry has been developed for offloading at least a portion of the data plane processing from server processors. For example, servers can incorporate a Field Programmable Gate Array ("FPGA") by coupling the FPGA to a Network Interface Card ("NIC") and a Central Processing Unit ("CPU"). During runtime, a software controller at the CPU can program the FPGA to perform flow action matching or other suitable data plane actions. For instance, the FPGA can be configured to implement an inbound processing path that includes an inbound packet buffer for holding received inbound packets, a parser configured to parse headers of the inbound packets, a lookup circuit configured to locate one or more matching actions in a flow match table based on at least a portion of the parsed headers, and an action circuit configured to performed the one or more matching actions on the inbound packets. The FPGA can also include an outbound processing path that includes similar components coupled to one another in a reverse direction of the inbound processing path.

In operation, the inbound processing path can receive an inbound packet from a computer network via, for example, a top-of-rack switch ("TOR"), store the received inbound packet in the inbound packet buffer, parse headers of the received inbound packet, locate one or more matching actions for the packet based on at least a portion of the headers, and perform the one or more matching actions on the inbound packet before forwarding the processed inbound packet to the NIC. The outbound processing path can receive an outbound packet from, for example, the NIC or the CPU, store the outbound packet in an outbound packet buffer, parse the received outbound packet, locate one or more matching actions for the outbound packet, and perform the one or more matching actions on the outbound packet before forwarding the processed outbound packet to the computer network, for example, via the same TOR.

The foregoing FPGA implementation, however, have several drawbacks. For example, in certain datacenters, an Express Route ("ER") gateway can serve as a next hop for secured network traffic coming from an on-premise network (e.g., of an organization) to a virtual network in a datacenter. In operation, the FPGA at the ER gateway can receive and subsequently forward packets from the on-premise network to a CPU of the ER gateway for further processing. However, the CPU of the ER gateway does not apply any processing to the received packets because the network traffic is received via a secured connection. Instead, the CPU executes certain instructions to provide a gateway virtual machine ("VM") that simply routes the received packets back to the NIC. The NIC, in turn, transmits the packets to a destination VM hosted on, for instance, another server, using IP forwarding or other suitable routing protocols. Thus, sending traffic via the VM at the ER gateway can add to network latency related to processing the packets from the on-premise network.

Several embodiments of the disclosed technology can address at least some of the foregoing limitations by enabling packet routing inside the FPGA. In certain embodiments, in addition to the components of the FPGA described above, the FPGA can also include (i) a TOR buffer and an inbound multiplexer in the inbound processing path; and (ii) a NIC buffer and an outbound multiplexer in the outbound processing path. The inbound multiplexer can be configured to receive input from the inbound packet buffer or the TOR buffer, and provide an output to the parser in the inbound processing path. The outbound multiplexer can be configured to receive input from the outbound packet buffer and the NIC buffer, and provide an output to the parser in the outbound processing path. The inbound multiplexer can be configured to process packets from the TOR buffer or the inbound packet buffer and the outbound multiplexer can be configured to process packets from the NIC buffer or the outbound packet buffer alternately, in a round-the-robin fashion, or in other suitable manners.

In accordance with embodiments of the disclosed technology, the action circuit of the inbound processing path can be configured to copy or forward inbound packets to the NIC buffer or alternatively to the NIC. Similarly, the action circuit of the outbound processing path can be configured to forward outbound packets to the TOR buffer or alternatively to the TOR according to certain policies or rules contained in a Match Action Table ("MAT") in the FPGA. For example, upon receiving an inbound packet from the TOR, the inbound parser can parse at least a portion of the header of the inbound packet and forward the parsed header to the lookup circuit in the inbound processing path. The lookup circuit can then match the packet to a flow based on at least a portion of the parsed header and identify an action for the inbound packet contained in the MAT. The action circuit can then perform the identified action by, for example, transposing or otherwise modifying the header of the inbound packet and forwarding the processed inbound packet with the modified header directly to the NIC buffer instead of to the NIC.

The outbound multiplexer can then process the inbound packet in the NIC buffer by forwarding the inbound packet to the outbound parser. The inbound packet with the modified header can then be processed according at least partially to parsed header of the inbound packet and forwarded to the TOR according to another policy or rule included in the MAT. As such, the inbound packet can be returned to the computer network via the TOR without being exposed to the CPU to be processed in software. Network traffic related to such routed packets is referred to herein as hairpin traffic. As a result, an ER gateway having the foregoing implementation of hairpin traffic in the FPGA can avoid using VMs for routing packets received from an on-premise network, and thus significantly reducing network latency for processing such packets in the datacenter.

The foregoing technique for implementing hairpin traffic in the FPGA, however, can involve certain difficulties for transmission rate limiting of hairpin traffic. Currently, network traffic for VMs (e.g., an ER gateway) is controlled by a NIC driver executing by the CPU of the server. However, when the FPGA loops such incoming traffic back to the TOR on behalf of the ER gateway, the NIC driver would not have control over the hairpin traffic. As such, hairpin traffic in the FPGA may overburden the network bandwidths available at the FPGA and/or the computer network such that other VMs on the server can experience network slowdowns or other undesirable effects.

Several embodiments of the disclosed technology can address at least certain aspects of the foregoing difficulties by implementing rate limiting of hairpin traffic in the FPGA. In one implementation, the NIC buffer (or a portion that is rate limited) can be logically divided into multiple channels or virtual ports each corresponding to a virtual machine or other suitable components hosted on the server. An example size for each channel can be 8K, 16K, 32K, or other suitable numbers of bytes. The outbound multiplexer can be implemented with a rate limiter circuit that is configured to throttle processing rates of hairpin traffic for the VMs hosted on the server by periodically incrementing processing or transmission allowance credits for each channel.

In one example, the rate limiter circuit can include a credit circuit operatively coupled to a timer circuit and a register circuit having multiple fields each for containing a credit value corresponding to each channel or virtual port. In operation, the credit circuit can receive one or more cycle signal from the timer circuit. In response, the credit circuit can increment a credit value for each of the channel or virtual port in the NIC buffer based on one or more of such cycle signals. For example, the timer circuit can be operating at 180 Mhz while the FPGA can process 32 bytes of data for each cycle of the timer circuit. Thus, each timer cycle takes approximately 5.5 nanoseconds. When a full size packet is about 1,600 bytes, the FPGA would take about 50 timer cycles to process a full size packet. When the assigned credits are provided in units of 32 bytes, to provide a credit to process 160 bytes, the credit circuit can increase the credit of a virtual port by 5 (160/32). Thus, a channel or virtual port would need 50 credits to transmit a full size packet out from the NIC buffer.

Assuming, a line speed of the computer network is 40 Gbps, and the FPGA can process 40 credits in 40 cycles of the timer circuit, If a software component on the server sets the timer interval to 40 cycles, credits to give to each hairpin traffic channel by every timer interval is shown in the table below:

| Network throughput | Increment interval (cycles) | 32 bytes per cycle |
|---|---|---|
| 1 Gbps | 40 | 1 |
| 3 Gbps | 40 | 3 |
| 10 Gbps | 40 | 10 |
| 40 Gbps | 40 | 40 |

As such, if one VM is throttled to 1 Gbps, it takes 50 timer cycles to accumulate 50 credits needed to process a full sized packet of about 1600 bytes. The latency created by such rate limiting is about 11 microseconds because 50 timer cycles takes about 50×40×5.5 nanoseconds=11 microseconds. Thus, a software component at the server can limit a transmission rate for a virtual machine via a virtual port by configuring the credits (e.g., 1, 3, 10, and 40) assigned to each virtual port for each timer interval.

When processing a hairpin traffic packet (e.g., a full size packet of about 1,600 bytes) from a channel or virtual port of the NIC buffer, the rate limiter circuit of the outbound multiplexer can first determine whether the channel has sufficient credits as stored in a corresponding field in the register circuit. For example, when the channel has a credit value of 90 credits, the rate limiter circuit can determine that the channel indeed has sufficient credits because 50 credits are need to transmit a full size packet. In response to such a determination, the outbound multiplexer can retrieve the packet from the NIC buffer, forward the packet to the outbound processing path, and decrement a current credit value of the channel by a number of credits (e.g., 50 credits) needed to process the packet. As such, the channel would now have a credit value of 40 credits until the credit circuit increments the number of credits at the next timer interval. On the other hand, when the channel does not have sufficient credits (e.g., only 40 credits are available), the outbound multiplexer can skip transmitting the packet from the channel and proceed to process additional packets in other channels of the NIC buffer as discussed above. The outbound multiplexer can thus pause transmission of the packet until the channel has sufficient credits to achieve a target transmission rate.

Several embodiments of the disclosed technology can limit transmission rates of hairpin traffic packets for certain virtual machines (e.g., ER gateways) in hardware, e.g., the FPGA. As such, over-utilization of the transmission bandwidth at the FPGA by one or more virtual machines at the server may be avoided. Also, several embodiments of the disclosed technology can prevent the hairpin traffic overwhelming non-hairpin traffic (e.g., packets sent from the VMs directly to the computer network). In certain embodiments, when the FPGA processes a non-hairpin traffic packet, the rate limiter circuit can also reduce the credit values of a corresponding channel by a number needed to process the non-hairpin traffic packet. As such, a network bandwidth consumed by the virtual machine for transmitting both hairpin and non-hairpin traffic can be limited to a target value.

DETAILED DESCRIPTION

Certain embodiments of systems, devices, components, modules, routines, data structures, and processes for routing network traffic in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-8.

As used herein, the term "distributed computing system" generally refers to an interconnected computer system having multiple network nodes that interconnect a plurality of servers or hosts to one another and/or to external networks (e.g., the Internet). The term "network node" generally refers to a physical network device. Example network nodes include routers, switches, hubs, bridges, load balancers, security gateways, or firewalls. A "host" generally refers to a physical computing device configured to implement, for instance, one or more virtual machines, virtual switches, or other suitable virtualized components. For example, a host can include a server having a hypervisor configured to support one or more virtual machines, virtual switches or other suitable types of virtual components.

A computer network can be conceptually divided into an overlay network implemented over an underlay network. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network.

Figure 5:
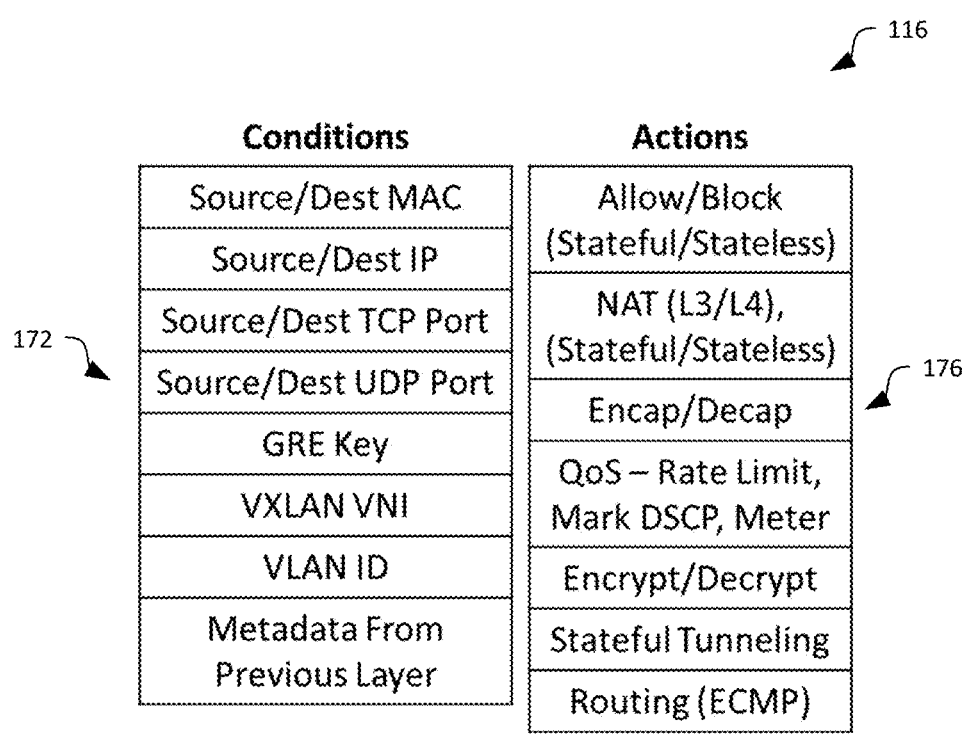
FIG. 5 is a schematic diagram illustrating example conditions and corresponding actions for a rule object suitable for a hardware packet processor in accordance with embodiments of the disclosed technology.

Further used herein, a Match Action Table ("MAT") generally refers to a data structure having multiple entries in a table format. Each of the entries can include one or more conditions and one or more corresponding actions. The one or more conditions can be configured by a network controller (e.g., an Software Defined Network or "SDN" controller) for matching a set of header fields of a packet. The action can also be programmed by the network controller to apply an operation to the packet when the conditions match the set of header fields of the packet. The applied operation can modify at least a portion of the packet in order to forward the packet to an intended destination. Further used herein, a "flow" generally refers to a stream of packets received/transmitted via a single network connection between two end points (e.g., servers, virtual machines, or applications executed in the virtual machines). A flow can be identified by, for example, an IP address and a TCP port number. A flow can have one or more corresponding entries in the MAT having one or more conditions and actions. Example conditions and actions are shown in FIG. 5.

As used herein, a "packet" generally refers to a formatted unit of data carried by a packet-switched network. A packet typically can include user data along with control data. The control data can provide information for delivering the user data. For example, the control data can include source and destination network addresses/ports, error checking codes, sequencing information, hop counts, priority information, security information, or other suitable information regarding the user data. Typically, the control data can be contained in headers and/or trailers of a packet. The headers and trailers can include one or more data field containing suitable information. An example data schema for control data is described in more detail below with reference to FIGS. 6A-6B.

Figure 1:
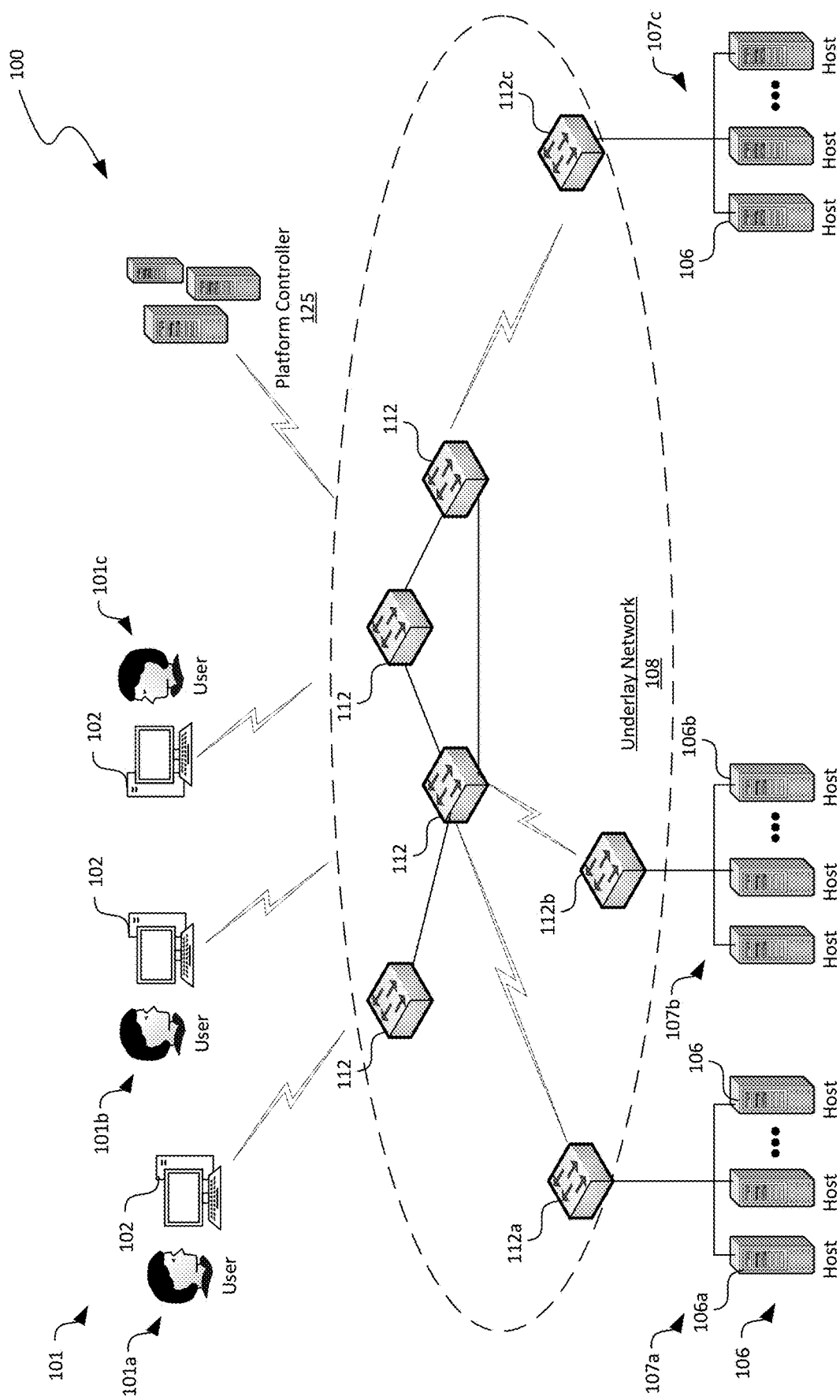
FIG. 1 is a schematic diagram illustrating a distributed computing system implementing network traffic routing in accordance with embodiments of the disclosed technology.

FIG. 1 is a schematic diagram illustrating a distributed computing system 100 implementing network traffic routing and associated transmission rate limiting in accordance with embodiments of the disclosed technology. As shown in FIG. 1, the distributed computing system 100 can include an underlay network 108 interconnecting a plurality of hosts 106, a plurality of client devices 102 associated with corresponding users 101, and a platform controller 125 operatively coupled to one another. Even though particular components of the distributed computing system 100 are shown in FIG. 1, in other embodiments, the distributed computing system 100 can also include additional and/or different components or arrangements. For example, in certain embodiments, the distributed computing system 100 can also include network storage devices, additional hosts, and/or other suitable components (not shown) in other suitable configurations.

As shown in FIG. 1, the underlay network 108 can include one or more network nodes 112 that interconnect the multiple hosts 106 and the client device 102 of the users 101. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. Each of the host sets 107a-107c is operatively coupled to a corresponding network nodes 112a-112c, respectively, which are commonly referred to as "top-of-rack" network nodes or "TORs." The TORs 112a-112c can then be operatively coupled to additional network nodes 112 to form a computer network in a hierarchical, flat, mesh, or other suitable types of topology. The underlay network can allow communications among hosts 106, the platform controller 125, and the users 101. In other embodiments, the multiple host sets 107a-107c may share a single network node 112 or can have other suitable arrangements.

The hosts 106 can individually be configured to provide computing, storage, and/or other suitable cloud or other suitable types of computing services to the users 101. For example, as described in more detail below with reference to FIG. 2, one of the hosts 106 can initiate and maintain one or more virtual machines 144 (shown in FIG. 2) upon requests from the users 101. The users 101 can then utilize the provided virtual machines 144 to perform computation, communications, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the users 101a-101c.

The client devices 102 can each include a computing device that facilitates the users 101 to access cloud services provided by the hosts 106 via the underlay network 108. In the illustrated embodiment, the client devices 102 individually include a desktop computer. In other embodiments, the client devices 102 can also include laptop computers, tablet computers, smartphones, or other suitable computing devices. Though three users 101 are shown in FIG. 1 for illustration purposes, in other embodiments, the distributed computing system 100 can facilitate any suitable numbers of users 101 to access cloud or other suitable types of computing services provided by the hosts 106 in the distributed computing system 100.

The platform controller 125 can be configured to manage operations of various components of the distributed computing system 100. For example, the platform controller 125 can be configured to allocate virtual machines 144 (or other suitable resources) in the distributed computing system 100, monitor operations of the allocated virtual machines 144, or terminate any allocated virtual machines 144 once operations are complete. In the illustrated implementation, the platform controller 125 is shown as an independent hardware/software component of the distributed computing system 100. In other embodiments, the platform controller 125 can also be a datacenter controller, a fabric controller, or other suitable types of controller or a component thereof implemented as a computing service on one or more of the hosts 106.

Figure 2:
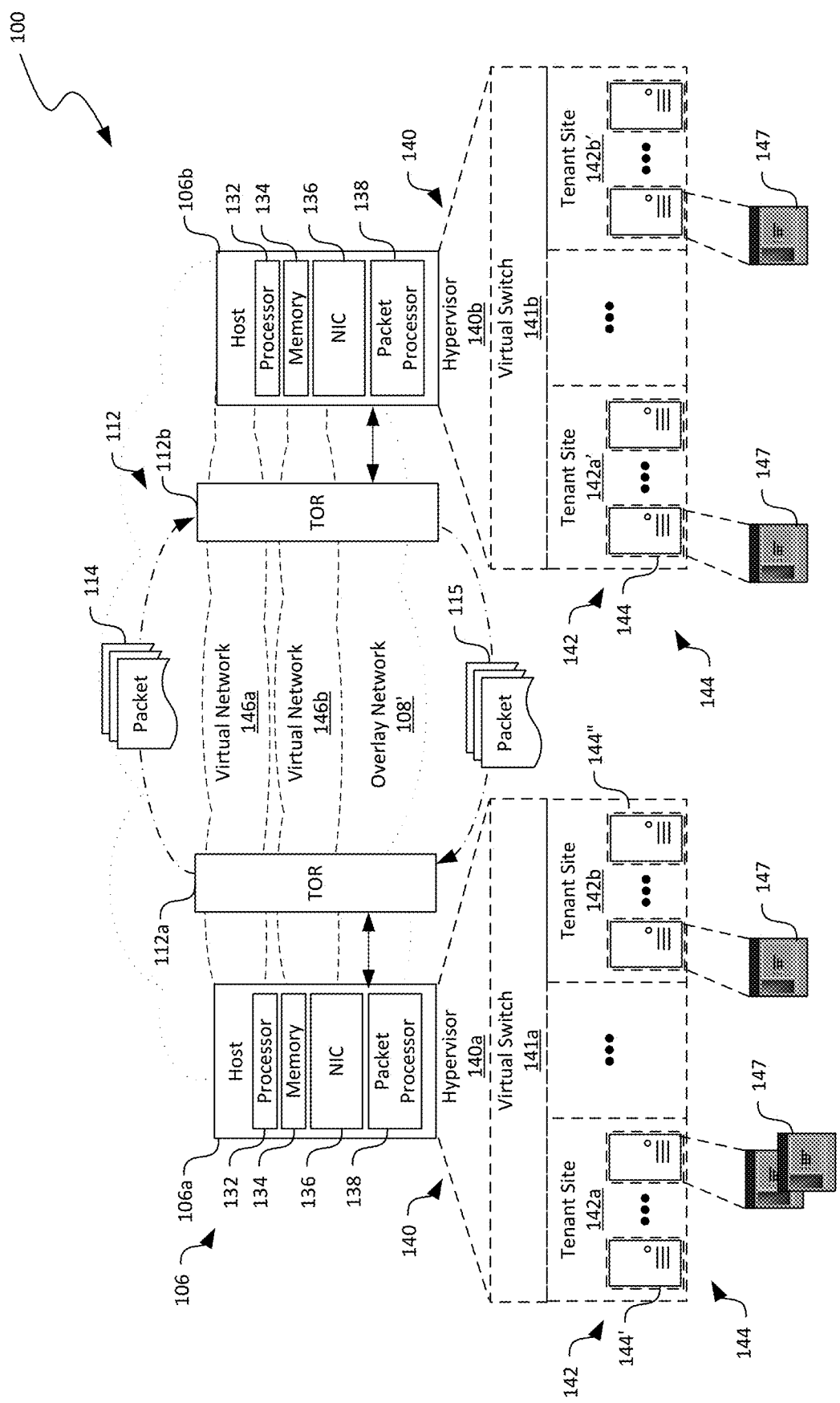
FIG. 2 is a schematic diagram illustrating certain hardware/software components of the distributed computing system of FIG. 1 in accordance with embodiments of the disclosed technology.

FIG. 2 is a schematic diagram illustrating certain hardware/software components of the distributed computing system 100 in accordance with embodiments of the disclosed technology. In particular, FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the underlay network 108 of FIG. 1 are shown for clarity.

In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the first host 106a and the second host 106b can each include a processor 132, a memory 134, a network interface card 136, and a packet processor 138 operatively coupled to one another. In other embodiments, the hosts 106 can also include input/output devices configured to accept input from and provide output to an operator and/or an automated software controller (not shown), or other suitable types of hardware components.

The processor 132 can include a microprocessor, caches, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 7A-7C). Though only one processor 132 and one memory 134 are shown in the individual hosts 106 for illustration in FIG. 2, in other embodiments, the individual hosts 106 can include two, six, eight, or any other suitable number of processors 132 and/or memories 134.

The first and second hosts 106a and 106b can individually contain instructions in the memory 134 executable by the processors 132 to cause the individual processors 132 to provide a hypervisor 140 (identified individually as first and second hypervisors 140a and 140b) and a virtual switch 141 (identified individually as first and second virtual switches 141a and 141b). Even though the hypervisor 140 and the virtual switch 141 are shown as separate components, in other embodiments, the virtual switch 141 can be a part of the hypervisor 140 (e.g., operating on top of an extensible switch of the hypervisors 140), an operating system (not shown) executing on the hosts 106, or a firmware component of the hosts 106.

The hypervisors 140 can individually be configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the first host 106a and the second host 106b can both host the tenant site 142a and 142a' for a first tenant 101a (FIG. 1). The first host 106a and the second host 106b can both host the tenant site 142b and 142b' for a second tenant 101b (FIG. 1). Each virtual machine 144 can be executing a corresponding operating system, middleware, and/or applications.

Also shown in FIG. 2, the distributed computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more applications 147 to provide suitable cloud or other suitable types of computing services to the users 101 (FIG. 1). The virtual machines 144 on the virtual networks 146 can also communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses. To facilitate communications among the virtual machines 144, the virtual switches 141 can be configured to switch or filter packets (not shown) directed to different virtual machines 144 via the network interface card 136 and facilitated by the packet processor 138.

As shown in FIG. 2, to facilitate communications with one another or with external devices, the individual hosts 106 can also include a network interface card ("NIC") 136 for interfacing with a computer network (e.g., the underlay network 108 of FIG. 1). A NIC 136 can include a network adapter, a LAN adapter, a physical network interface, or other suitable hardware circuitry and/or firmware to enable communications between hosts 106 by transmitting/receiving data (e.g., as packets) via a network medium (e.g., fiber optic) according to Ethernet, Fibre Channel, Wi-Fi, or other suitable physical and/or data link layer standards. During operation, the NIC 136 can facilitate communications to/from suitable software components executing on the hosts 106. Example software components can include the virtual switches 141, the virtual machines 144, applications 147 executing on the virtual machines 144, the hypervisors 140, or other suitable types of components.

In certain implementations, a packet processor 138 can be interconnected to and/or integrated with the NIC 136 in order to facilitate network traffic operations for enforcing communications security, performing network virtualization, translating network addresses, maintaining or limiting a communication flow state, or performing other suitable functions. In certain implementations, the packet processor 138 can include a Field-Programmable Gate Array ("FPGA") integrated with the NIC 136.

An FPGA can include an array of logic circuits and a hierarchy of reconfigurable interconnects that allow the logic circuits to be "wired together" like logic gates by a user after manufacturing. As such, a user can configure logic blocks in FPGAs to perform complex combinational functions, or merely simple logic operations to synthesize equivalent functionality executable in hardware at much faster speeds than in software. In the illustrated embodiment, the packet processor 138 has one interface communicatively coupled to the NIC 136 and another coupled to a network switch (e.g., a Top-of-Rack or "TOR" switch) at the other. In other embodiments, the packet processor 138 can also include an Application Specific Integrated Circuit ("ASIC"), a microprocessor, or other suitable hardware circuitry. In any of the foregoing embodiments, the packet processor 138 can be programmed by the processor 132 (or suitable software components associated therewith) to route packets inside the packet processor 138 in order to enable routing network traffic received from the TOR 112 back to the TOR 112 without software processing by the processor 132 and associated rate limiting of such routed network traffic, as described in more detail below with reference to FIGS. 3A-4.

In operation, the processor 132 and/or a user 101 (FIG. 1) can configure logic circuits in the packet processor 138 to perform complex combinational functions or simple logic operations to synthesize equivalent functionality executable in hardware at much faster speeds than in software. For example, the packet processor 138 can be configured to process inbound/outbound packets for individual flows according to configured policies or rules contained in a flow table such as a MAT. The flow table can contain data representing processing actions corresponding to each flow for enabling private virtual networks with customer supplied address spaces, scalable load balancers, security groups and Access Control Lists ("ACLs"), virtual routing tables, bandwidth metering, Quality of Service ("QoS"), etc.

As such, once the packet processor 138 identifies an inbound/outbound packet as belonging to a particular flow, the packet processor 138 can apply one or more corresponding policies in the flow table before forwarding the processed packet to the NIC 136 or TOR 112. For example, as shown in FIG. 2, the application 147, the virtual machine 144, and/or other suitable software components on the first host 106a can generate an outbound packet 114 destined to, for instance, another application 147 at the second host 106b. The NIC 136 at the first host 106a can forward the generated packet 114 to the packet processor for processing according to certain policies in a flow table. Once processed, the packet processor 138 can forward the outbound packet 114 to the first TOR 112a, which in turn forwards the packet to the second TOR 112b via the overlay/underlay network 108 and 108'.

The second TOR 112b can then forward the packet 114 to the packet processor 138 at the second host 106b to be processed according to other policies in another flow table at the second hosts 106b. If the packet processor 138 cannot identify a packet as belonging to any flow, the packet processor 138 can forward the packet to the processor 132 via the NIC 136 for exception processing. In another example, when the first TOR 112a receives an inbound packet 115, for instance, from the second host 106b via the second TOR 112b, the first TOR 112a can forward the packet 115 to the packet processor 138 to be processed according to a policy associated with a flow of the packet 115. The packet processor 138 can then forward the processed packet 115 to the NIC 136 to be forwarded to, for instance, the application 147 or the virtual machine 144.

In certain implementations, the NIC/packet processor 136/138 can forward packets 114/115 to the processor 132 for software processing even though the processor 132 has no need to or otherwise does not apply any modifications to the packets. Instead, the processor 132 simply routes the packets back to the NIC/packet processor 136/138, which in turn transmit the packets to the underlay network 108. For instance, an Express Route ("ER") gateway can serve as a next hop for network traffic coming from an on-premise network to a virtual network in the distributed computing system 100.

In operation, the NIC/packet processor 136/138 would forward the packets 114 to the processor 132 of an ER gateway (e.g., the first host 106a). However, the processor 132 of the first host 106a does not apply any processing to the network traffic because the network traffic is received via a secured connection and thus considered secure. Instead, the processor 132 at the first host 106a would instantiate a virtual machine 144 to simply route the network traffic of the ER gateway back to the NIC/packet processor 136/138 to be transmitted to a destination virtual machine 144 on, for instance, the second host 106b, using IP forwarding or other suitable protocols. Thus, routing network traffic via the virtual machine 144 at the ER gateway can add significant extra network latency for the network traffic coming from an on-premise network.

Several embodiments of the disclosed technology can address at least some aspects of the foregoing limitations by implementing network traffic routing inside the packet processor 138. As such, the packet processor 138 can route received network traffic back to the overlay/underlay network 108'/108 without being directly forwarded to the NIC 136. Network traffic related to such routed packets is referred to herein as "hairpin traffic." Several embodiments of the disclosed technology are also related to implementing rate limiting in the packet processor 138 to limit or control a transmission rate of such hairpin traffic to prevent such hairpin traffic from over consuming network bandwidth at the packet processor 138, as described in more detail below with reference to FIGS. 3A-4.

Figure 3A:
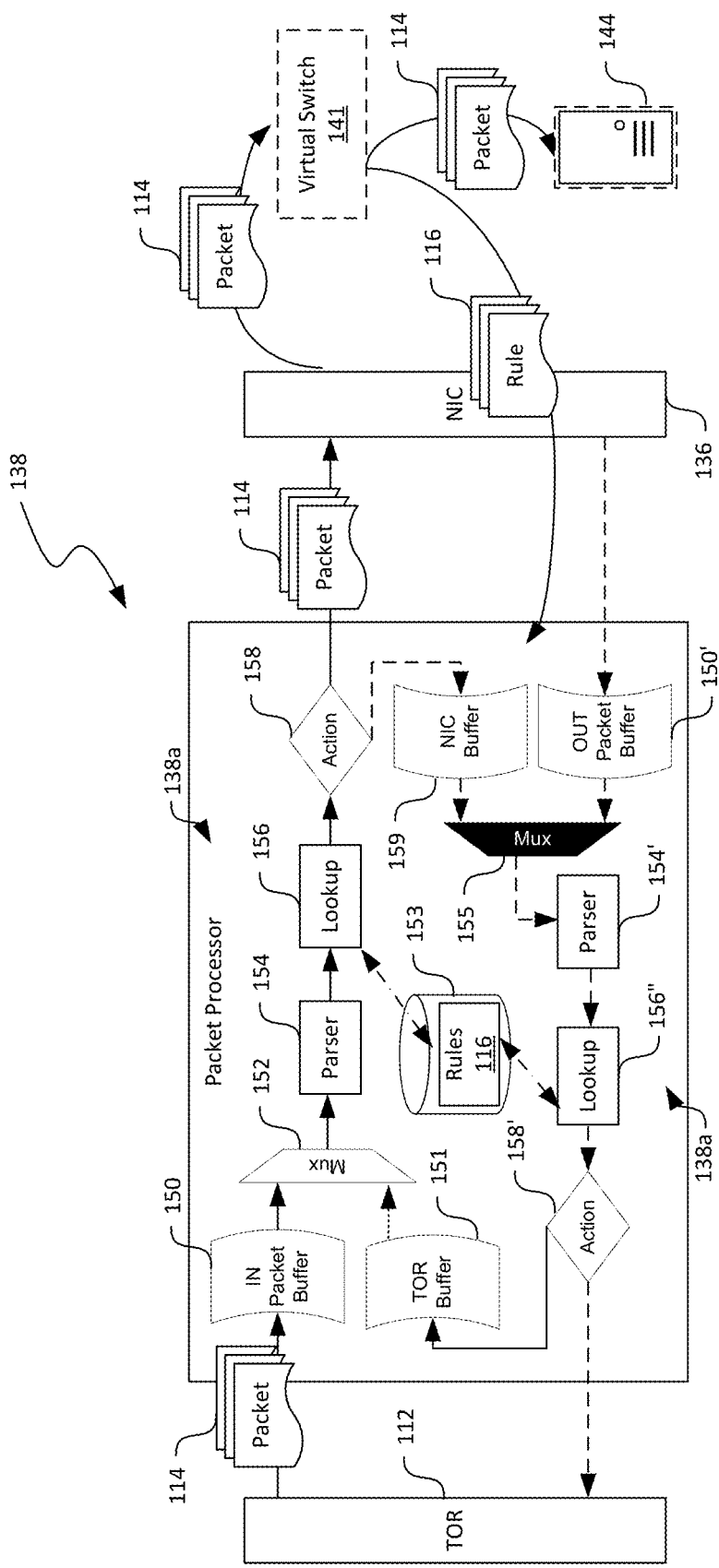
FIGS. 3A-3C are schematic diagrams illustrating a hardware packet processor implemented at a host in a distributed computing system during certain operations in accordance with embodiments of the disclosed technology.
Figure 3B:
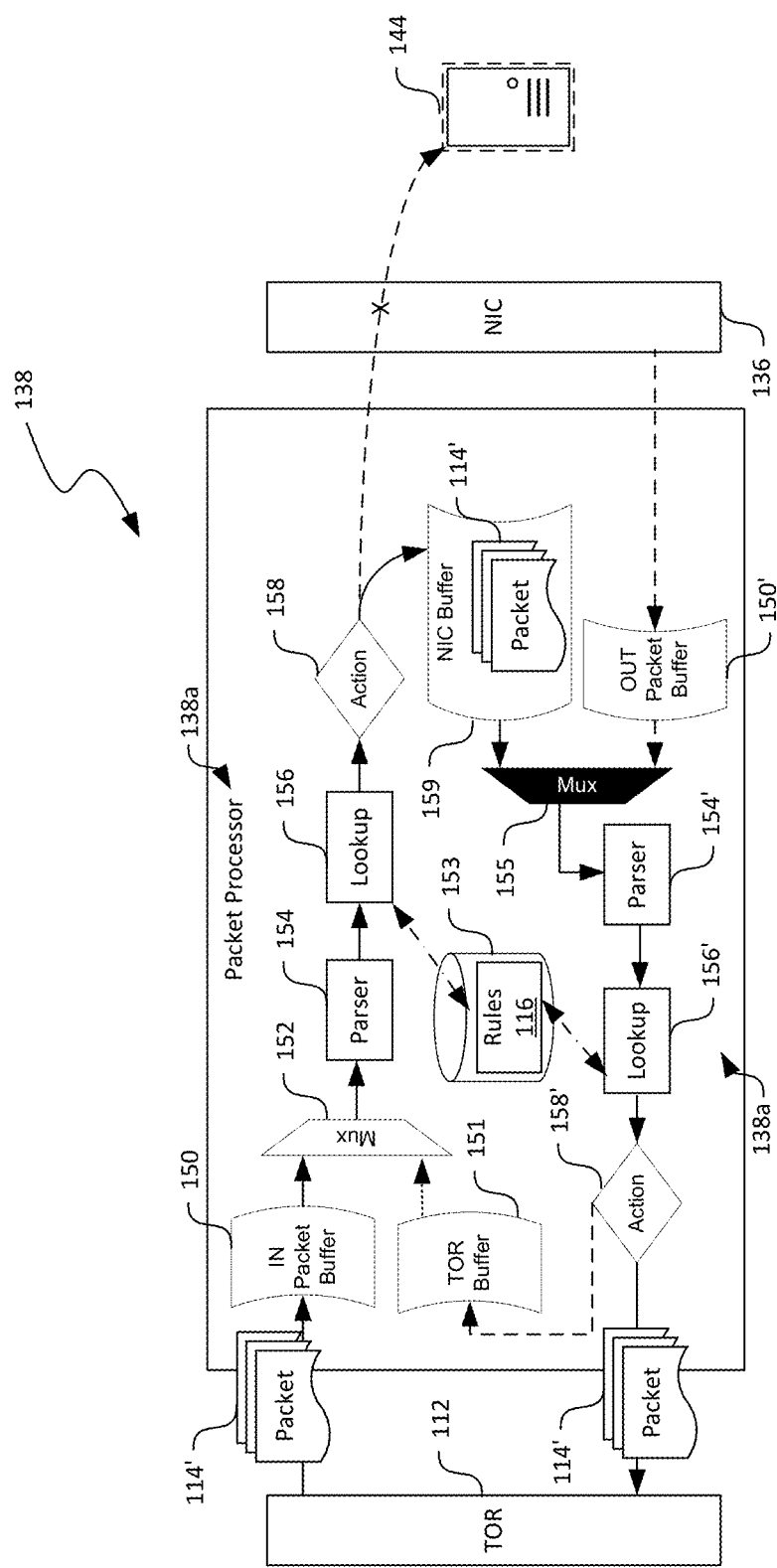
Figure 3C:
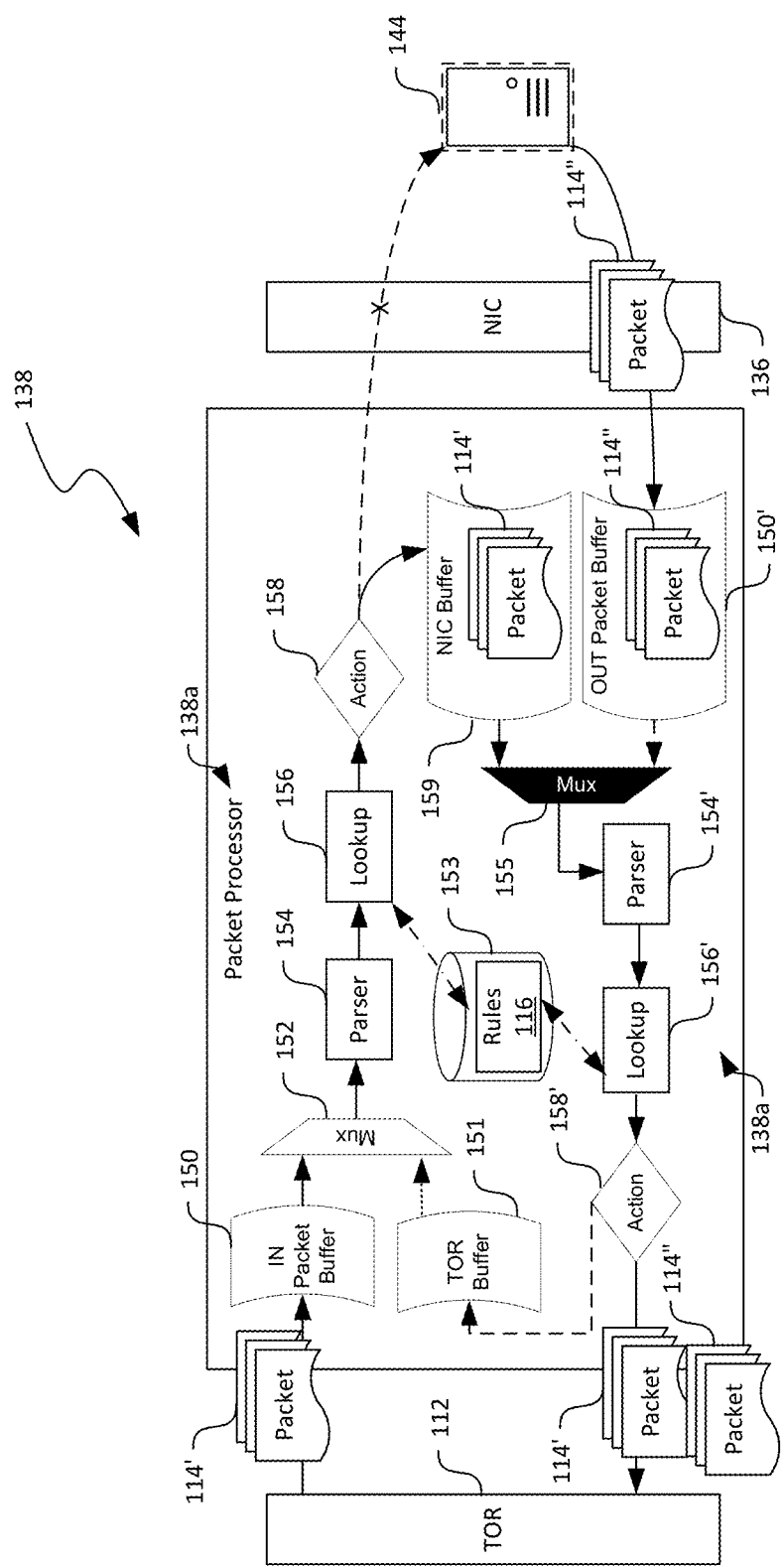

FIG. 3A-3C are schematic diagrams illustrating a hardware packet processor 138 implemented at a host 106 in a distributed computing system 100 during certain operations in accordance with embodiments of the disclosed technology. As shown in FIG. 3A, in certain implementations, the packet processor 138 can include an inbound processing path 138a and an outbound processing path 138b in opposite processing directions. The inbound processing path 138a can include a set of processing circuits having an inbound packet buffer 150 (shown as "IN Packet Buffer" in FIG. 3A), a parser 152, a lookup circuit 156, and an action circuit 158 interconnected with one another in sequence. The outbound processing path 138b can include another set of processing circuits having an outbound packet buffer 150' (shown as "OUT Packet Buffer" in FIG. 3A), a parser 152', a lookup circuit 156', and an action circuit 158' interconnected with one another in sequence and in the opposite processing direction.

In accordance with embodiments of the disclosed technology, the packet processor 138 can also include a TOR buffer 151 and an inbound multiplexer 152 in the inbound processing path 138a and a NIC buffer 159 and an outbound multiplexer 155 in the outbound processing path 138b. As shown in FIG. 3A, the TOR buffer 151 and the inbound packet buffer 150 are arranged to provide an output to the inbound multiplexer 152. The NIC buffer 159 and the outbound packet buffer 150' are arranged to provide an output to the outbound multiplexer 155. As described in more detail below, the outbound multiplexer 155 can include circuitry configured to perform rate limiting on hairpin traffic from the NIC buffer 159.

In turn, the inbound multiplexer 152 can be configured to receive input from each of the inbound packet buffer 150 and the TOR buffer 151 and provide an output to the parser 154 in the inbound processing path 138a. The outbound multiplexer 155 can be configured to receive input from the outbound packet buffer 150' and the NIC buffer 159 and provide an output to the parser 154' in the outbound processing path 138b. The inbound multiplexer 152 can be configured to process packets from the TOR buffer 151 or the inbound packet buffer 150 alternately, in a round-the-robin fashion, or in other suitable manners. The outbound multiplexer 155 can be configured to process packets 114 from the NIC buffer 159 or the outbound packet buffer 150' alternately, in a round-the-robin fashion, or in other suitable manners.

As shown in FIG. 3A, the packet processor 138 can also include a memory 153 containing a flow table having one or more policies or rules 116. The rules 116 can be configured by, for example, the virtual switch 141 or other suitable software components provided by the processor 132 (FIG. 2) to provide certain actions when corresponding conditions are met. Example conditions and actions are described in more detail below with reference to FIG. 5. Even though the flow table is shown being contained in the memory 153 in the packet processor 138, in other embodiments, the flow table may be contained in a memory (not shown) outside of the packet processor 138, in the memory 134 (FIG. 2), or in other suitable storage locations.

FIG. 3A shows an operation of the packet processor 138 when receiving an inbound packet 114 that is not identifiable by the packet processor 138 as being belonging to a flow and thus does not have a corresponding rule 116. As shown in FIG. 3A, the TOR 112 can forward the packet 114 to the packet processor 138 to be temporarily stored in the inbound packet buffer 150. The inbound multiplexer 152 can then forward the packet 114 from the inbound packet buffer 150 to the inbound parser 154. The inbound parser 154 can parse at least a portion of the header of the packet 114 and forward the parsed header to the lookup circuit 156 in the inbound processing path 138a. The lookup circuit 156 can then attempt to match the packet 114 to a flow based on the parsed header and identify an action for the packet 114 as contained in the flow table.

However, when lookup circuitry 156 cannot match the packet 114 to any existing flow in the flow table, the action circuit 158 can forward the received packet 114 to a software component (e.g., the virtual switch 141) provided by the processor 132 for further processing. As shown in FIG. 3A, the virtual switch 141 (or other suitable software components) can then generates data representing a flow to which the packet 114 belongs and one or more rules 116 for the flow. The virtual switch 141 can then transmit the created rules 116 to the packet processor 138 to be stored in the memory 153. In the illustrated embodiment, the virtual switch 141 also forwards the received packet 114 to a virtual machine 144. In other embodiments, the virtual switch 141 can forward the packet 114 back to the packet processor 138 to be processed by the created new rules 116, or perform other suitable operations on the packet 114.

In accordance with embodiments of the disclosed technology, the action circuit 158 of the inbound processing path 138a can be configured to forward additional inbound packets 114' to the NIC buffer 159 as shown in FIG. 3B, and the action circuit 158' of the outbound processing path 138b can be configured to forward outbound packets (not shown) to the TOR buffer 151, according to certain policies or rules 116 contained in the flow table. In FIGS. 3A-3C, solid lines represent used network traffic paths while dashed lines represent unused network traffic paths.

As shown in FIG. 3B, upon receiving another inbound packet 114' from the TOR 112, the inbound parser 154 can parse at least a portion of the header of the packet 114' and forward the parsed header to the lookup circuit 156 in the inbound processing path 138a. The lookup circuit 156 can then match the packet 114 to a flow based on the parsed header and identify an action for the packet 114' as contained in the flow table. In the illustrated example, the identified action can indicate that the packet 114' is to be forwarded to the NIC buffer 159 instead of to the NIC 136. The action circuit 158 can then perform the identified action by, for example, forwarding the transposed packet 114' to the NIC buffer 159 instead of to the NIC 136 after transposing the header of the packet 114' and/or performing other suitable packet manipulations.

The outbound multiplexer 155 can then process the transposed packet 114' in the NIC buffer 159 by forwarding the transposed packet 114' to the outbound parser 154'. The transposed packet 114' can then be processed according to at least partially parsed header of the packet 114' and forwarded to the TOR 112 according to another rule 116 in the flow table. As such, the inbound packet 114' can be returned to the computer network via the TOR 112 without being transmitted to the virtual machines 144 or the processor 132 (FIG. 2) to be processed in software.

The foregoing implementation can be used to reduce network latency when the packets 114' are forwarded to the processor 132 for software processing even though the processor 132 has no need to or otherwise does not apply any modifications to the packets. For example, an ER gateway server having the packet processor 138 implemented with packet routing inside the packet processor 138 can simply return the packets 114' as hairpin traffic from an on-premise network to the computer network without forwarding the packets 114' to the processor 132 for software processing. Test performed with components generally similar to those described above showed a network latency reduction of about 600 microseconds when processing such hairpin traffic from on-premise networks. The observed network latency reduction enabled an increase of data rate from about 1.5 gigabits/second to about 25 gigabits/second.

The foregoing implementation, however, can involve certain difficulties for transmission rate limiting for such hairpin traffic. Currently, network traffic for virtual machines 144 and 144' (e.g., gateway VMs related to an ER gateway) is controlled by a NIC driver (not shown) executing by the processor 132 (FIG. 2) of the host 106. However, when the packet processor 138 loops such incoming traffic back to the TOR 112 on behalf of the gateway server, the NIC driver would not even be aware of the traffic. As such, the hairpin traffic related to the gateway server may overburden the network bandwidth provided by the packet processor 138 and/or exceed a network bandwidth to be provided to the gateway server according to a service agreement.

In accordance with embodiments of the disclosed technology, the outbound multiplexer 155 can be configured to implement selective hairpin traffic rate limiting when processing packets 114' from the NIC buffer 159 (or a portion thereof). In certain embodiments, the NIC buffer 159 can be logically divided into multiple channels 169 (shown in FIG. 4) or virtual ports each corresponding to a virtual machine 144 hosted on the host 106. An example size for each channel 169 can be 8K, 16K, 32K, or other suitable number of bytes. The outbound multiplexer 155 can be implemented with a rate limiter circuit 161 (shown in FIG. 4) that is configured to throttle a rate of hairpin traffic for the virtual machines 144 on the host 106. For instance, the outbound multiplexer 155 would process the packet 114' from the NIC buffer 114' only when a corresponding channel 169 has sufficient transmission allowance credits (or "credits"). Otherwise, the outbound multiplexer 155 can skip processing the packet 114' during an initial processing cycle. During subsequent processing cycles, the outbound multiplexer 155 can recheck the transmission credits of the corresponding channel 169 and process the packet 114' accordingly.

FIG. 3C illustrates another operating scenario for the outbound multiplexer 155. As shown in FIG. 3C, the virtual machine 144 can also generate and transmit outbound packet(s) 114" via the NIC 136. The outbound packet 114" is then temporarily stored in the outbound packet buffer 150'. During processing, the outbound multiplexer 155 can determine whether the outbound packet 114" is related to a channel 169 or virtual port that corresponds to the virtual machine 144. When the outbound packet 114" is determined to be related to the channel 169 of the virtual machine 144, the outbound multiplexer 155 can forward the outbound packet 114" to the parser 154' in the outbound processing path 138a and decrement a credit value of the channel 169 for transmitting the hairpin traffic. As such, an assigned network bandwidth to the virtual machine 144 by the virtual switch 141 (FIG. 3A) or other suitable software components can be achieved. Example components and operations of the rate limiter circuit 161 are described in more detail below with reference to FIG. 4.

Figure 4:
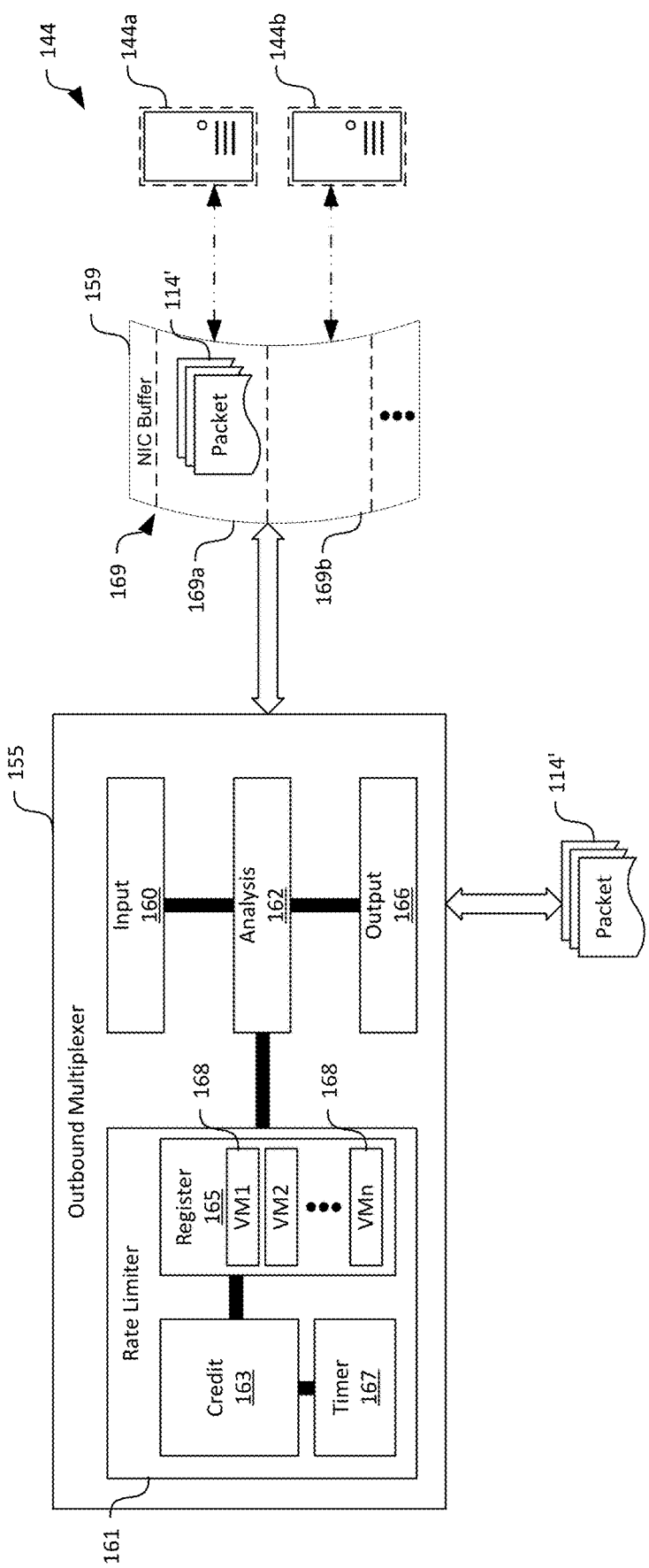
FIG. 4 is a schematic diagram illustrating an outbound multiplexer implemented with a rate limiter circuit in accordance with embodiments of the disclosed technology.

FIG. 4 is a schematic diagram illustrating an example of the outbound multiplexer 155 in FIGS. 3A-3C implemented with a rate limiter circuit in accordance with embodiments of the disclosed technology. As shown in FIG. 4, the NIC buffer 159 can be logically divided into multiple channels 169 (e.g., 4, 8, 16, or 32 channels) individually corresponding to a virtual machine 144. For example, the first channel 169a corresponds to the first virtual machine 144a while a second channel 169b corresponds to a second virtual machine 144b. An example size for each channel 169 can be 8K, 16K, 32K, or other suitable number of bytes. Though FIG. 4 shows the NIC buffer 159 as containing multiple rate-limited channels 169, in other embodiments, the NIC buffer 159 can include a rate limited portion and a non-rate limited portion (not shown). In further embodiments, the rate limited and non-rate limited portions may be configured as separate buffers.

A software component (e.g., the virtual switch 141 in FIG. 3A) can be configured to assign the channels 169 to the individual virtual machines 144 by transmitting, for example, a configuration command. If the software component needs to re-arrange the allocated channels 169, the software component can issue a flush command first, then a configuration command with new settings. After receiving a flush command, the packet processor 138 can pause the hairpin traffic processing pipeline, transmit all packets 114' queued in the NIC buffer 159. The packet processor 138 can resume rate-limit processing for one or the channels 169 after receiving a configuration command to enable rate-limiting. In other embodiments, the software component can also issue a flush command to pause the hairpin traffic processing pipeline for all the rate-limited virtual machines 144, transmit all packets 114' queued inside the NIC buffer 159, and disable rate-limit processing for all channels 169.

In certain implementations, the packet processor 138 can maintain a rate-limit buffer table (not shown) with multiple entries (e.g., 32 entries with index 0-32) for containing data representing the foregoing channel assignments. When the software component assigns a channel 169 to a virtual machine 144, the software component can specify an index of the entries, e.g., a start address and an end address that define a buffer section in the NIC buffer 159. For example, a start address of a 256 KB NIC buffer 159 is 0x0000, end address is 0x1FFF, with a step value of 32 bytes. To allocate 8 KB from the beginning of the 256 KB NIC buffer 159, the start address is 0x0000, and the end address is 0x00FF. As described in more detail below, the NIC buffer 159 can cooperate with the outbound multiplexer 155 for performing rate limiting on processing packets from the various channels 169 in the NIC buffer 159.

Also shown in FIG. 4, the outbound multiplexer 155 can include an input circuit 160, an analysis circuit 162, an output circuit 166, and a rate limiter circuit 161 operatively coupled to one another. The input circuit 160 can be configured to receive the packet 114' from, for example, the first channel 169a of the NIC buffer 159. The analysis circuit 162 can then analyze at least a portion of a header of the packet 114' to determine a corresponding channel 169 (e.g., the first channel 169a). The analysis circuit 162 can then cooperate with the rate limiter circuit 161 to determine whether the corresponding channel 169 has sufficient credits to process the packet 114', as described in more detail below.

As shown in FIG. 4, the rate limiter circuit 161 can include a credit circuit 163, a register 165, and a timer 167 operatively coupled to one another. Even though particular components of the rate limiter circuit 161 are shown in FIG. 4, in other embodiments, the rate limiter circuit 161 can also include calculation or other suitable types of circuits. Timer circuit 167 can be configured to provide cycle signals to the credit circuit 163 at certain time interval. For example, the timer circuit 167 can be operating at 180 Mhz. Thus, each timer cycle takes approximately 5.5 nanoseconds. As such, every 5.5 nanoseconds, the timer circuit 167 can provide a cycle signal to the credit circuit 163.

The register 165 can include multiple fields 168 individually corresponding to a virtual machine 144. For example, field "VM1" can correspond to the first virtual machine 144a while field "VM2" can correspond to the second virtual machine 144b. Each field 168 can include a circuit (e.g., representing 8 or 16 bits) configured to contain a credit value represented as a positive or negative integer or other suitable types of number. For instance, the field "VM1" can contain a credit value of 90 credits corresponding to the first virtual machine 144a.

The credit values contained in the register 165 can be incremented by the credit circuit 163 based on cycle signals from the timer circuit 167, as explained with the following example. Though particular numbers are used for illustration purposes, in other embodiments, the outbound multiplexer 155 can be configured to operate with other suitable parameter values. Assuming, that the packet processor 138 (FIG. 3A) can process 32 bytes of data for each cycle of the timer circuit 167. When a full size packet 144' is about 1,600 bytes, the packet processor 138 would take 50 cycles to process the full size packet 114'. When the assigned credits are incremented in units of 32 bytes, to provide a credit to process 160 bytes, the credit circuit 163 can increase the credit value of a channel 169 by 5. Thus, a channel 169 would need 50 credits to transmit a full size packet out from the NIC buffer 159.

Assuming, a line speed of the packet processor 138 is 40 Gbps, the packet processor 138 can process 40 credits in 40 cycles of the timer circuit 167. If a software component (e.g., the virtual switch 141 in FIG. 3A) on the host 106 sets the increment interval to 40 cycles, credits to give to each channel 169 by every increment interval is shown in the table below:

| Network throughput | Increment interval (cycles) | 32 bytes per cycle |
|---|---|---|
| 1 Gbps | 40 | 1 |
| 3 Gbps | 40 | 3 |
| 10 Gbps | 40 | 10 |
| 40 Gbps | 40 | 40 |

As such, if the first virtual machine 144a is throttled at 1 Gbps, it takes 50 timer cycles to accumulate 50 credits needed to process a full sized packet of about 1600 bytes. The latency created by such rate limiting is about 11 microseconds because 50 timer cycles takes about 50×40× 5.5 nanoseconds=11 microseconds. Thus, a software component (e.g., the virtual switch 141 in FIG. 3A) at the host 106 can limit a transmission rate for the first virtual machine 144a to 1 Gbps by configuring the credits to be assigned to the first channel 169a for each increment interval of 40 timer cycles to be 1.

When processing a hairpin traffic packet (e.g., a full size packet 114' of about 1,600 bytes) from the first channel 169a of the NIC buffer 159, the rate limiter circuit 161 of the outbound multiplexer 155 can first determine whether the first channel 169a has sufficient credits as stored in a corresponding field (e.g., field "VM1") in the register circuit 165. For instance, when the first channel 169a has a credit value of 90 credits, the rate limiter circuit 161 or the analysis circuit 162 can determine that the first channel 169a indeed has sufficient credits to process the packet 144' because only 50 credits are need to transmit a full size packet.

In response to such a determination, the analysis circuit 162 can indicate to the output circuit 166 to forward the packet 144' to the outbound processing path 138 (FIG. 3A), and indicate to the credit circuit 163 to decrement a current credit value of the first channel 169a by a number of credits (e.g., 50 credits in the above example) needed to process the packet 144'. As such, the first channel 169a would now have a credit value of 40 credits until the credit circuit 163 increments the number of credits at the next increment interval. On the other hand, when the first channel 169a does not have sufficient credits (e.g., only 40 credits are available), the analysis circuit 162 can indicate to the output circuit 166 to skip transmitting the packet 144' from the first channel 169a and proceed to process additional packets in other channels 169 of the NIC buffer 159, as discussed above. The outbound multiplexer 155 can thus pause transmission of the packet 144' in the first channel 169a until the first channel 169a has sufficient credits to achieve a target transmission rate.

If rate-limiting is enabled on a channel 169, but there is no traffic for some time, the credit value for the channel 169 may accumulate to a high value. Such a high credit value may cause traffic burst when the channel 169 suddenly received traffic. To prevent such a traffic burst, the software component can set a maximum credit limit for each channel 169. Once the credit value has reached the maximum credit limit, the credit value would not increase over additional increment intervals. Similarly, if there is no hairpin traffic for a channel 169 for some time, non-hairpin traffic of the channel may decreases the credit value to a very low value. As such, new hairpin traffic for the channel 169 may be blocked. To prevent such blockage, the software component can also set a minimum credit limit to the channel 169.

FIG. 5 is a schematic diagram illustrating example conditions and corresponding actions for a rule 116 (FIGS. 3A-3C) as an entry in a flow table in accordance with embodiments of the disclosed technology. In certain embodiments, as shown in FIG. 5, the rule 116 can include actions upon matching packets in a MAT model. When creating an entry, a network controller (not shown) can be expressive while reducing fixed policy in a data plane.

As shown in FIG. 5, the rule 116 can include a condition list containing multiple conditions 172, and one or more corresponding actions 176. Example conditions 172 can include source/destination MAC, source/destination IP, source/destination TCP port, source/destination User Datagram Protocol ("UDP") port, general routing encapsulation key, Virtual Extensible LAN identifier, virtual LAN ID, or other metadata regarding the payload of the packet. Conditions 172 can have a type (such as source IP address) and a list of matching values (each value may be a singleton, range, or prefix). For a condition to match a packet, any of the matching values can match as in an OR clause. For an rule 116 to match, all conditions 172 in the rule 116 match as in an AND clause.

The action 176 can also contain a type and a data structure specific to that type with data needed to perform the action. For example, an encapsulation rule 116 can takes as input data a source/destination IP address, source/destination MAC address, encapsulation format and key to use in encapsulating the packet. As shown in FIG. 5, the example actions can include allow/circuit a packet according to, for example, ACLs, network name translation (L3/L4), encapsulation/decapsulation, quality of service operations (e.g., rate limit, mark differentiated services code point, metering, etc.), encryption/decryption, stateful tunneling, and routing (e.g., equal cost multiple path routing).

The rule 116 can be implemented via a callback interface, e.g., initialize, process packet, and de-initialize. If a rule type supports stateful instantiation, the virtual switch 141 (FIG. 2) or other suitable types of process handler can create a pair of flows in the packet processor 138 (FIG. 3A). Flows can also be typed and have a similar callback interface to rules 116. A stateful rule 116 can include a time to live for a flow, which is a time period that a created flows can remain in a flow table after a last packet matches unless expired explicitly by a TCP state machine. In addition to the example set of actions 176 in FIG. 5, user-defined actions can also be added, allowing the network controllers to create own rule types using a language for header field manipulations.

Figure 6A:
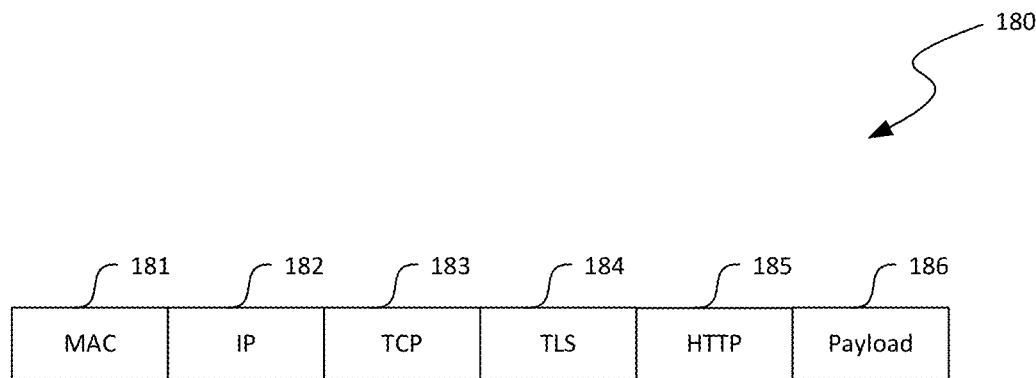
FIGS. 6A and 6B illustrate an example data schema for a packet header suitable to be processed by a hardware packet processor in accordance with embodiments of the disclosed technology.

FIG. 6A is a schematic diagram illustrating a data schema 180 suitable for a packet header in accordance with embodiments of the disclosed technology. As shown in FIG. 6A, the data schema 180 can include a MAC field 181, an IP field 182, a TCP field 183, a TLS field 184, an HTTP field 185, and a data field 186. The MAC field 181, the IP field 182, and the TCP field 183 can be configured to contain a MAC address, an IP address, and a port number of the NIC 136 (FIG. 2) and/or the host 106 (FIG. 2), respectively. The TLS field 184 can be configured to contain a value indicating a type of data contained in the packet. Example values for the TLS field 184 can include APPLICATION_DATA, CHANGE_CIPHER_SPEC, ALERT, or HANDSHAKE. The HTTP field 185 can be configured to contain various parameters according to the HTTP protocol. For example, the parameters can include a content length of the data in the data field 186, cache control, etc. Example header fields of the HTTP field 185 are described in more detail with reference to FIG. 6B. Even though the example data schema 180 includes the HTTP field 185, in other embodiments, the data schema 180 can include Secure Shell, Secure Copy, Secure FTP, or other suitable header fields.

Figure 6B:
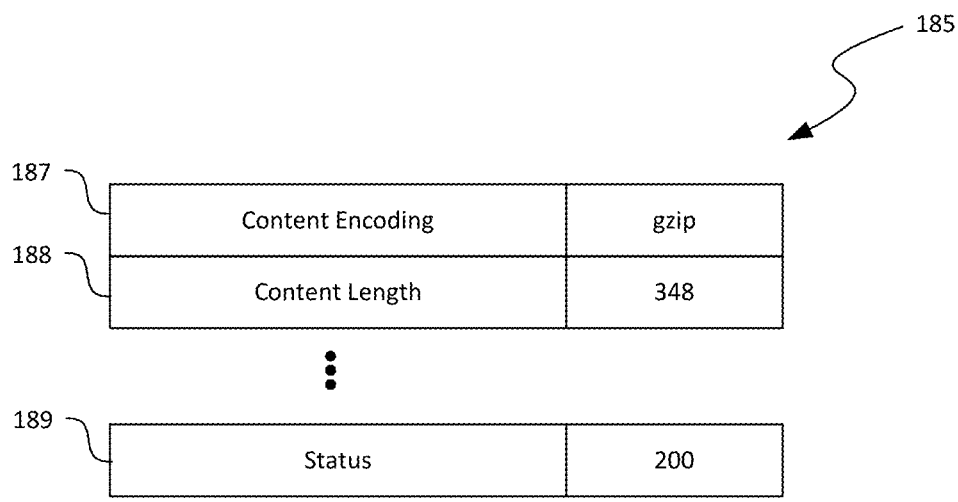

FIG. 6B is a schematic diagram illustrating example header fields suitable for the HTTP field 185 in FIG. 6A in accordance with embodiments of the disclosed technology. As shown in FIG. 6B, the header fields can include a content encoding field 187 configured to contain an encoding identification, a content length field 188 configured to store a content or payload length in, for instance, bytes, and a status field 189 configured to contain a numerical value indicating whether the content or payload associated with the HTTP header is valid. In the illustrated example, the content encoding field 187 contains "gzip" as an encoding identifier; the content length field 188 contains "348" indicating that the content or payload is 348 bytes long; and the status field 189 contains a numerical value of "200" indicating that the content or payload is valid. Though particular fields are shown in FIG. 6B as examples, in other embodiments, the HTTP header 185 can also include fields configured to contain content language, content location, content range, and/or other suitable parameters.

Figure 7A:
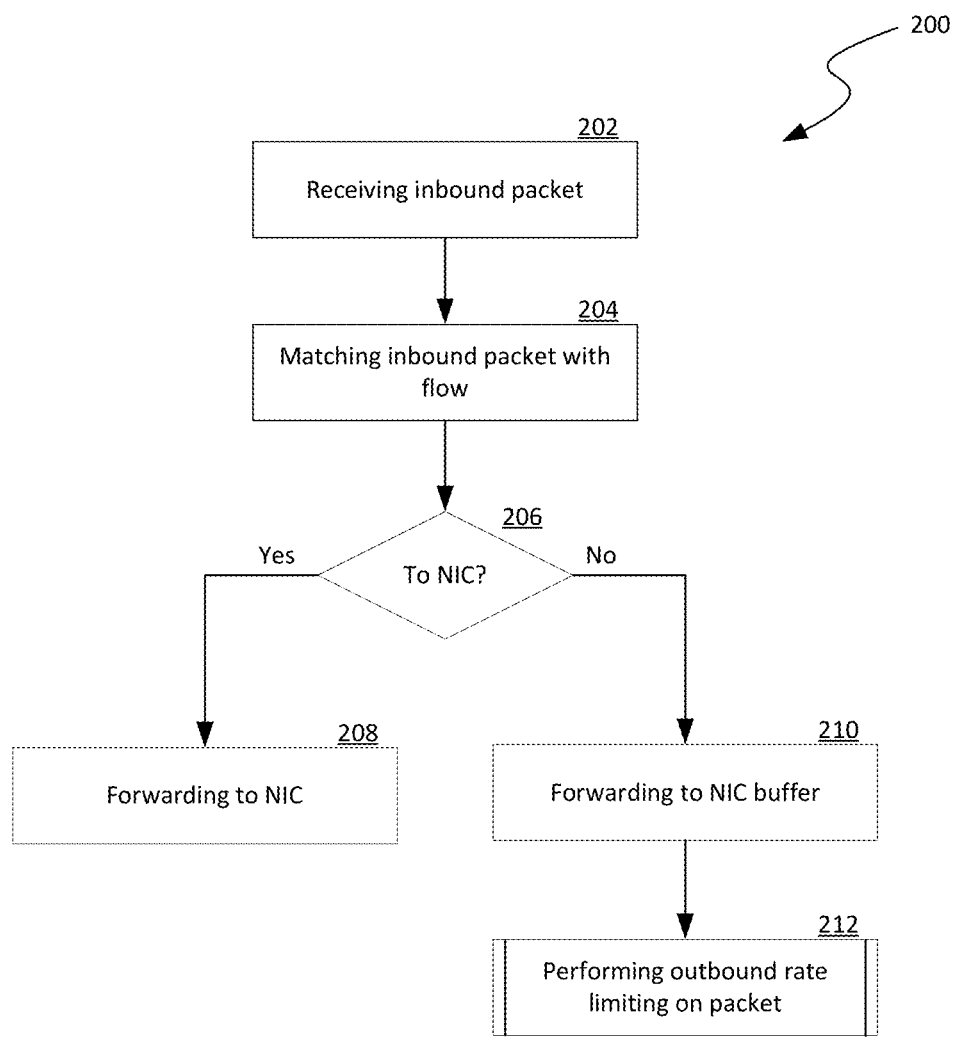
FIGS. 7A-7C are flowcharts illustrating processes for network traffic routing in accordance with embodiments of the disclosed technology.
Figure 7B:
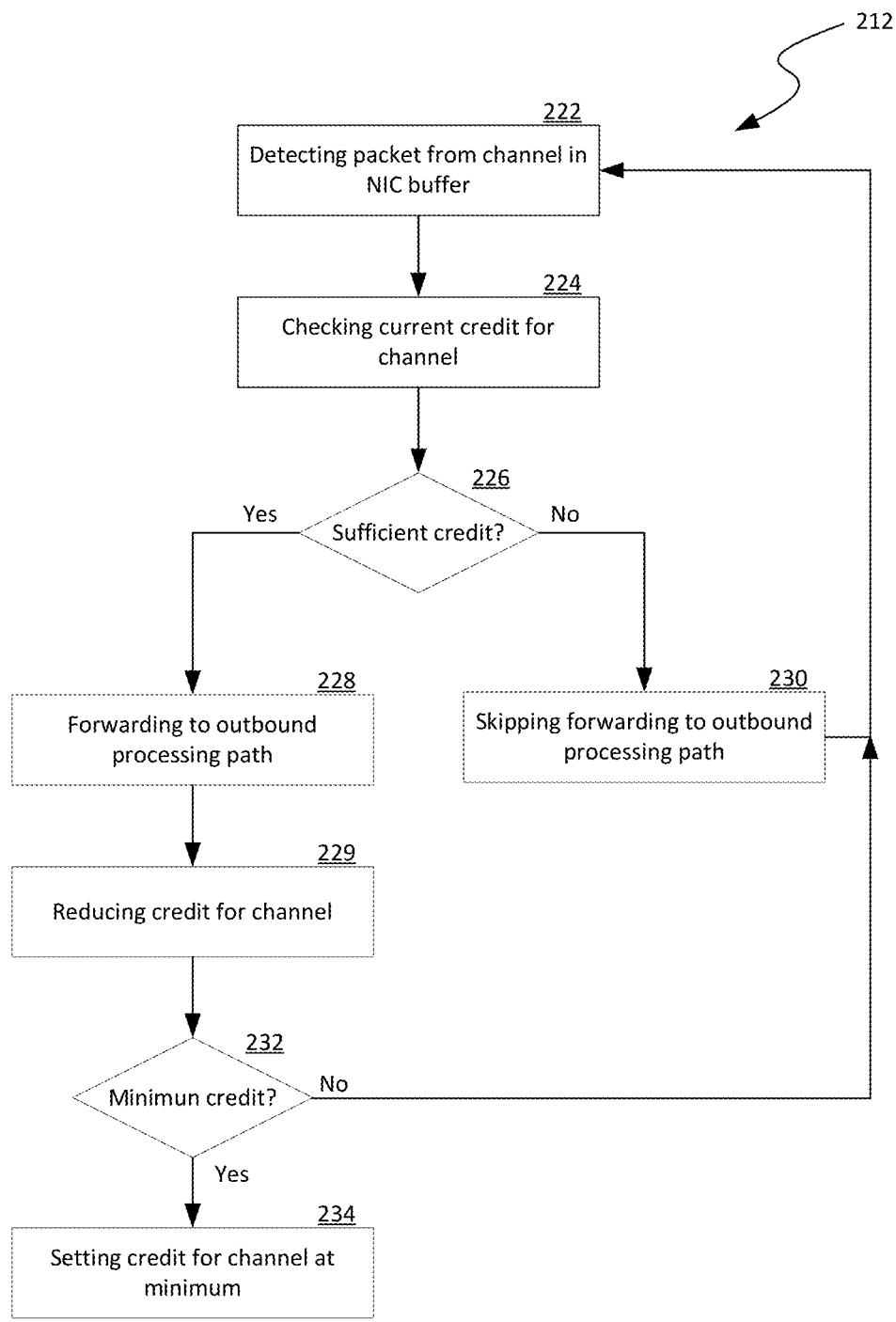
Figure 7C:
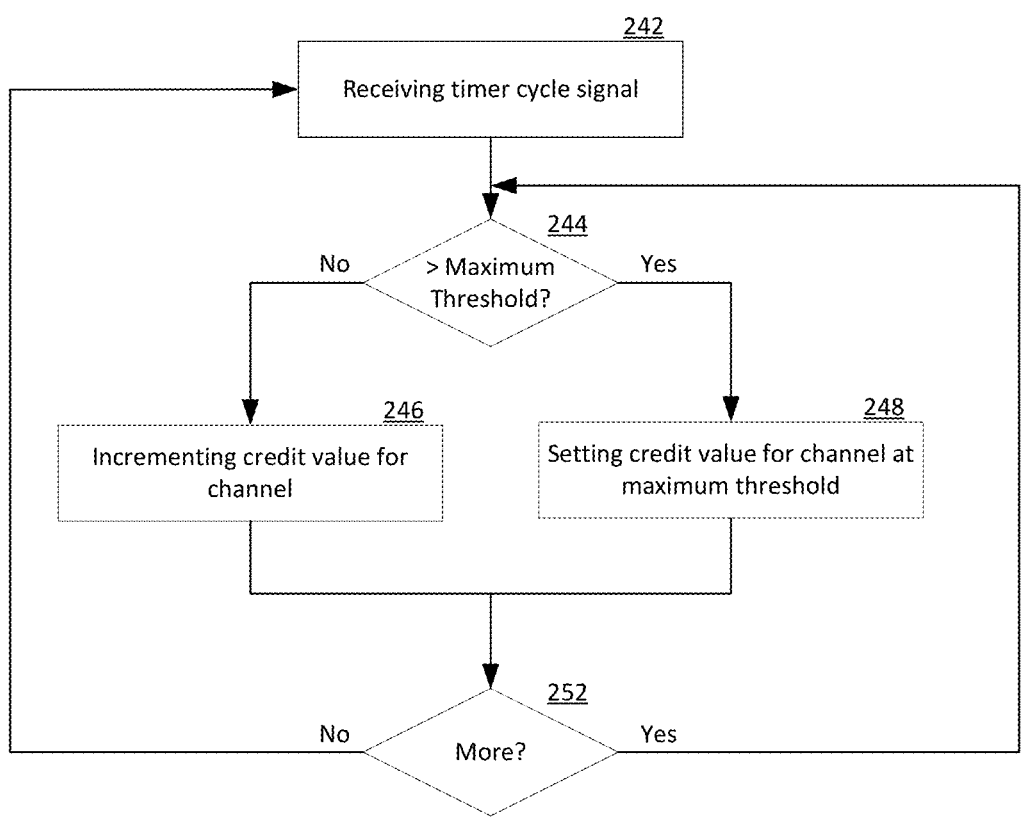

FIGS. 7A-7C are flowcharts illustrating processes for implementing rate limiting on hairpin traffic in a hardware packet processor in accordance with embodiments of the disclosed technology. Though the processes are described below in light of the distributed computing system 100 of FIGS. 1-4, in other embodiments, the processes can also be performed in other computing systems with similar or different components.

As shown in FIG. 7A, the process 200 can include receiving an inbound packet at stage 202. In certain embodiments, the inbound packet may be received at a packet processor 138 (FIG. 2) from a TOR 112 (FIG. 2) interconnected to a host 106 (FIG. 2) incorporating the packet processor 138. In other embodiments, the inbound packet may be received from other suitable network nodes. The process 200 can then include matching the received inbound packet with a flow in a flow table at stage 204. In certain embodiments, matching the inbound packet can include parsing a header of the inbound packet, matching at least a portion of the header to an entry in a flow table, and identifying an action corresponding to the entry. In other embodiments, matching the inbound packet can also include forwarding the inbound packet to a software component for further processing when an entry in the flow table cannot be located as matching the inbound packet.

The process 200 can then include a decision stage 206 to determine whether the inbound packet is to be forwarded to a NIC 136 (FIG. 2) of the host 106 based on the identified action in the flow table. In one example, the inbound packet is to be forwarded to the NIC 136 when the inbound packet is destined to an application 147 (FIG. 2), a virtual machine 144 (FIG. 2), or other suitable components in the host 106. In other examples, the inbound packet is to be forwarded to the NIC 136 for other suitable reasons. As shown in FIG. 7A, in response to determining that the inbound packet is to be forwarded to the NIC 136, the process 200 can include forwarding the inbound packet to the NIC 136, by, for example, copying the inbound packet into a buffer of the NIC 136 at stage 208. Otherwise, the process 200 can include forwarding the inbound packet to a NIC buffer 161 (FIG. 3A) in the packet processor 138.

The process 200 can then include performing outbound processing on the inbound packet in the NIC buffer and performing rate limiting when processing the inbound packet at stage 212. In certain embodiments, the outbound processing can be initiated when the outbound multiplexer 155 (FIG. 3A) determines that a corresponding channel or virtual port through which the inbound packet is processed has sufficient credit. Credits for such processing can be incremented by the outbound multiplexer 155 based on a timer interval of one or more timer cycles, as described above with reference to FIG. 4. When the outbound multiplexer 155 determines that the channel has sufficient credits, the outbound multiplexer 155 can forward the inbound packet from the NIC buffer to the outbound processing path 138b.

In certain implementations, outbound processing can include parsing the header of the packet and matching at least a portion of the parsed header to one or more entries in the flow table identifying one or more actions. The process 200 can then include performing the identified actions to, for instance, forwarding the packet to the TOR 112 without transmitting the inbound packet to the NIC 136. As such, the virtual switch 141 (FIG. 2) or other suitable software components provided by the processor 132 (FIG. 2) of the host 106 never receives the inbound packet, nor performing any software processing on the inbound packet.

When the outbound multiplexer 155 determines that the channel does not have sufficient credits, the outbound multiplexer 155 can skip processing the inbound packet in the NIC buffer. Subsequently, the outbound multiplexer 155 can recheck the credits of the channel and determine whether to forward the inbound packet to the outbound processing path 138a accordingly. Example operations of performing the foregoing rate limiting are described in more detail below with reference to FIG. 7B.

As shown in FIG. 7B, the operations can include detecting the inbound packet is present in a channel or virtual port in the NIC buffer at stage 222. Upon detecting the presence of the inbound packet, the operations can include checking a current credit value corresponding to the channel or virtual port at stage 224. In certain implementations, the credit value of the channel can be stored in a register on the packet processor 138 (FIG. 3A). The credit value can be incremented periodically, as described in more detail below with reference to FIG. 7C. In other embodiments, the credit value of the channel can be stored in a flash memory or other suitable components of the host 106 (FIG. 1).

The operations can then include a decision stage 226 to determine whether the channel has sufficient credit to process the inbound packet. In certain embodiments, the determination can be made by comparing the current credit value to a number of credits needed to process the inbound packet of a corresponding size. Examples of such determination are described above with reference to FIG. 4. In other embodiments, the determination can be made by comparing the current credit value to a preset threshold, or made in other suitable manners.

In response to determining that the channel has sufficient credit, the operations can include forwarding the inbound packet from the channel in the NIC buffer to the outbound processing path 138a (FIG. 3A) at stage 228, and reducing the credit value of the channel by the number of credits needed to process the inbound packet at stage 229. The operations can then include another decision stage 232 to determine whether the reduced credit value is below a minimum threshold (e.g., −50). In response to determining that the reduced credit value is below the minimum threshold, the operations can include setting the credit value to the minimum threshold at stage 234. Otherwise, the operations can revert to detecting one or more packets from another channel in the NIC buffer at stage 222.

In response to determining that the channel does not have sufficient credit, the operations can include skipping processing the inbound packet from the channel in the NIC buffer at stage 230. The operations can then revert to detecting one or more packets from another channel in the NIC buffer at stage 222. Once all other channels have been processed, the operations can then recheck the credit value for the initial channel at stage 224 after detecting that the inbound packet is still present in the initial channel at stage 222.

FIG. 7C is a flowchart illustrating example operations for incrementing credit values for processing packets from corresponding channels in the NIC buffer. As shown in FIG. 7C, the operations can include receiving a timer cycle signal at stage 242. The timer cycle signal can be generated by a timer circuit on the packet processor 138 (FIG. 3A), from a timer circuit on the processor 132 (FIG. 2), or from other suitable sources. The operations can then include a decision stage 244 to determine whether a current credit value for the channel is greater than or equal to a maximum credit threshold (e.g., 50 credits). In response to determining that current credit value for the channel is not greater than or equal to the maximum credit threshold, the operations can include incrementing the credit value of the channel by a preset amount at stage 246. Otherwise, the operations can include setting the current credit value at the maximum credit threshold at stage 248. The operations can then include another decision stage 252 to determine whether additional channels are present. In response to determining that additional channels are present, the operations include reverting to decision stage 244 for the next channel. Otherwise, the operations reverts to receiving additional timer cycle signals stag stage 242.

Figure 8:
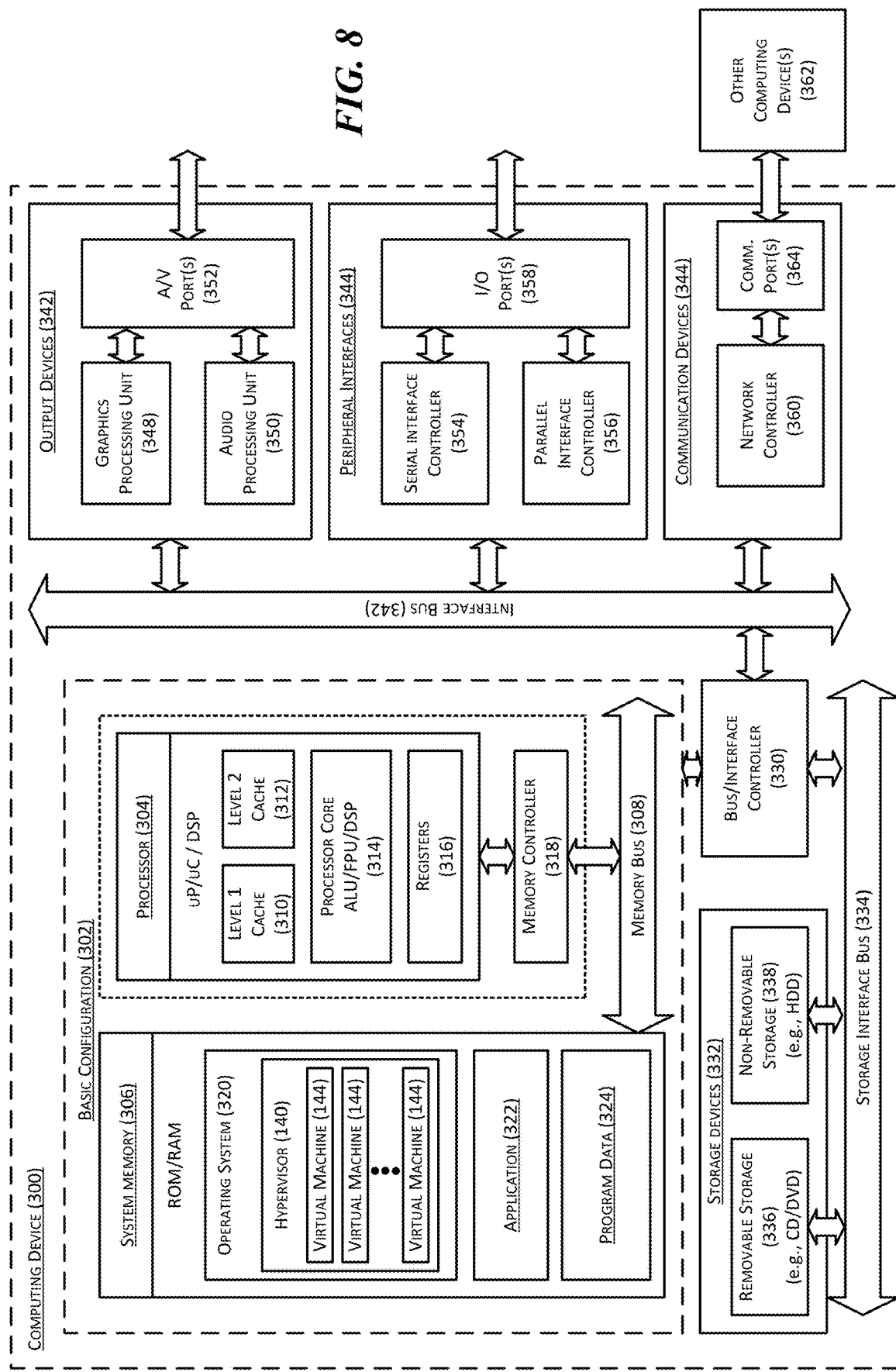
FIG. 8 is a computing device suitable for certain components of the distributed computing system in FIG. 1.

FIG. 8 is a computing device 300 suitable for certain components of the distributed computing system 100 in FIG. 1. For example, the computing device 300 can be suitable for the hosts 106, the client devices 102, or the platform controller 125 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 11, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for routing network traffic in a distributed computing system having a plurality of servers interconnected by a computer network, the individual servers having a main processor, a network interface card ("NIC"), and a hardware packet processor operatively coupled to one another, the method comprising:

receiving, from the computer network, a packet at the packet processor of a server, the packet processor including inbound and outbound processing paths in opposite processing directions, wherein the packet processor includes a NIC buffer in the outbound processing path;

forwarding the received packet from the inbound processing path to the NIC buffer in the outbound processing path instead of the NIC, the packet being assigned to a virtual port in the NIC buffer;

checking whether the virtual port in the NIC buffer has sufficient transmission allowance to process the packet based on a size of the packet; and when the virtual port in the NIC buffer has sufficient transmission allowance,
      processing the packet following the outbound processing path to forward the packet from the server to the computer network; and
      decrementing the transmission allowance of the virtual port by an amount corresponding to the size of the packet, thereby limiting a transmission rate of the virtual port to a target value.

2. The method of claim 1, further comprising:
   when the virtual port does not have sufficient transmission allowance, skipping processing the packet in the NIC buffer; and
subsequently, rechecking whether the virtual port in the NIC buffer has sufficient transmission allowance to process the packet.

3. The method of claim 1, further comprising:
incrementing the transmission allowance of the virtual port upon receiving one or more timer cycle signals from a timer circuit by an amount corresponding to the target value of the transmission rate of the virtual port.

4. The method of claim 1, further comprising:
determining whether the transmission allowance of the virtual port exceeds a threshold value;
in response to determining that the transmission allowance of the virtual port does not exceed the threshold value, incrementing the transmission allowance of the virtual port upon receiving one or more timer cycle signals from a timer circuit by an amount corresponding to the target value of the transmission rate of the virtual port; and
in response to determining that the transmission allowance of the virtual port exceeds the threshold value, setting the transmission allowance of the virtual port to the threshold value.

5. The method of claim 1 wherein decrementing the transmission allowance includes:
determining whether a current value of the transmission allowance is below a threshold value; and
in response to determining that the current value of the transmission allowance is not below the threshold value, decrementing the transmission allowance of the virtual port by the amount corresponding to the size of the packet; and
in response to determining that the current value of the transmission allowance is below the threshold value, setting the transmission allowance to the threshold value.

6. The method of claim 1, further comprising:
when the virtual port does not have sufficient transmission allowance,
skipping processing the packet in the NIC buffer;
incrementing the transmission allowance of the virtual port upon receiving one or more timer cycle signals from a timer circuit by an amount corresponding to the target value of the transmission rate of the virtual port; and
rechecking whether the virtual port in the NIC buffer has sufficient transmission allowance to process the packet.

7. The method of claim 1, further comprising:
when the virtual port does not have sufficient transmission allowance,
skipping processing the packet in the NIC buffer; and
incrementing the transmission allowance of the virtual port upon receiving one or more timer cycle signals from a timer circuit by an amount corresponding to the target value of the transmission rate of the virtual port;
rechecking whether the incremented transmission allowance of the virtual port is sufficient to process the packet; and
processing the packet following the outbound processing path to forward the packet to the computer network when the incremented transmission allowance is sufficient to process the packet.

8. The method of claim 1 wherein:
the virtual port corresponds to a virtual machine hosted on the server;
the packet is a first packet; and
the method further includes:
receiving, at the packet processor, a second packet from the virtual machine via the NIC;
upon receiving the second packet,
processing the second packet following the outbound processing path to forward the second packet to the computer network; and
decrementing the transmission allowance of the virtual port by an amount corresponding to a size of the processed second packet, thereby limiting a transmission rate of the virtual machine to a target value.

9. The method of claim 1 wherein:
the virtual port corresponds to a virtual machine hosted on the server;
the packet is a first packet;
the outbound processing path includes an outbound multiplexer operatively coupled to the NIC buffer and an outbound packet buffer configured to receive a second packet from the virtual machine via the NIC, the outbound multiplexer being configured to process input from the NIC buffer and the outbound packet buffer in a round-a-robin fashion; and
the method further includes:
processing the second packet in the outbound packet buffer following the outbound processing path to forward the second packet to the computer network; and
decrementing the transmission allowance of the virtual port by an amount corresponding to a size of the processed second packet, thereby limiting a transmission rate of the virtual machine to a target value.

10. A computing device connectable to other computing devices in a distributed computing system by a computer network, comprising:
a processor;
a network interface card ("NIC"); and
a field programmable gate array ("FPGA") operatively coupled to the processor and the NIC, the FPGA having:
an inbound processing path and outbound processing path in opposite processing directions, the outbound processing path having a NIC buffer connected to a corresponding input of an outbound multiplexer, wherein:
the inbound processing path is configured to receive a packet from the computer network and forward the received packet to the NIC buffer instead of the NIC, the packet being assigned to a virtual port in the NIC buffer; and
the outbound multiplexer is configured to:
determine whether the virtual port in the NIC buffer has sufficient transmission allowance to process the packet in the NIC buffer based on a size of the packet; and
in response to determining that the virtual port in the NIC buffer has sufficient transmission allowance, forward the packet to the computer network along the outbound processing path and decrement the transmission allowance of the virtual port by an amount corresponding to the size of the packet, thereby limiting a transmission rate of the virtual port to a target value.

11. The computing device of claim 10 wherein the outbound multiplexer is also configured to, in response to determining that the virtual port does not have sufficient transmission allowance, skip processing the packet in the NIC buffer.

12. The computing device of claim 10 wherein the outbound multiplexer is also configured to increment the transmission allowance of the virtual port upon receiving one or more timer cycle signals from a timer circuit by an amount corresponding to the target value of the transmission rate of the virtual port.

13. The computing device of claim 10 wherein the outbound multiplexer is also configured to:
  determine whether the transmission allowance of the virtual port exceeds a threshold value;
  in response to determining that the transmission allowance of the virtual port does not exceed the threshold value, increment the transmission allowance of the virtual port upon receiving one or more timer cycle signals from a timer circuit by an amount corresponding to the target value of the transmission rate of the virtual port; and
  in response to determining that the transmission allowance of the virtual port exceeds the threshold value, set the transmission allowance of the virtual port to the threshold value.

14. The computing device of claim 10 wherein the outbound multiplexer is also configured to:
  determine whether a current value of the transmission allowance is below a threshold value; and
  in response to determining that the current value of the transmission allowance is not below the threshold value, decrement the transmission allowance of the virtual port by the amount corresponding to the size of the packet; and
  in response to determining that the current value of the transmission allowance is below the threshold value, set the transmission allowance to the threshold value.

15. The computing device of claim 10 wherein:
  the outbound processing path also includes an outbound packet buffer connected to a corresponding input of the outbound multiplexer;
  the virtual port corresponds to a virtual machine hosted on the server;
  the packet is a first packet; and
  the outbound multiplexer is also configured to:
    receive a second packet from the virtual machine via the NIC and the outbound packet buffer;
    upon receiving the second packet,
      forward the second packet to the computer network along the outbound processing path; and
      decrement the transmission allowance of the virtual port by an amount corresponding to a size of the processed second packet, thereby limiting a transmission rate of the virtual machine to a target value.

16. A method for routing network traffic in a distributed computing system having a plurality of servers interconnected by a computer network, the individual servers having a main processor, a network interface card ("NIC"), and a field programmable gate array ("FPGA") operatively coupled to one another, the FPGA having an inbound processing path and an outbound processing path with a NIC buffer, wherein the method comprising:
  receiving, at a server, a packet from the computer network, the packet being associated with a virtual machine hosted on the server;
  processing the receiving packet along the inbound processing path and forwarding the received packet to the NIC buffer in the outbound processing path on the FPGA instead of the NIC, the packet being associated with a virtual port in the buffer;
  determining whether the virtual port in the NIC buffer has a sufficient number of credits to process the packet in the NIC buffer based on a size of the packet;
  in response to determining that the virtual port in the buffer has a sufficient number of credits, forwarding the packet from the NIC buffer to the computer network and decrementing the number of credits of the virtual port by an amount corresponding to the size of the packet; and
  in response to determining that the virtual port in the buffer does not have a sufficient number of credits, skipping processing the packet and allowing the packet to remain in the NIC buffer in the outbound processing path on the FPGA.

17. The method of claim 16, further comprising periodically incrementing the number of credits of the virtual port by an amount corresponding to a target value of the transmission rate of the virtual port.

18. The method of claim 16, further comprising:
  periodically incrementing the number of credits of the virtual port by an amount corresponding to a target value of the transmission rate of the virtual port; and
  in response to determining that the virtual port in the NIC buffer does not have a sufficient number of credits, rechecking whether the virtual port in the NIC buffer has sufficient number of credits to process the packet remaining in the NIC buffer.

19. The method of claim 16 wherein:
  the virtual port corresponds to a virtual machine hosted on the server;
  the packet is a first packet; and
  the method further includes:
    receiving, at the FPGA, a second packet from the virtual machine via the NIC;
    upon receiving the second packet, at the FPGA,
    forwarding the second packet to the computer network; and
    decrementing the number of credits of the virtual port by an amount corresponding to a size of the processed second packet.

20. The method of claim 16 wherein:
  the virtual port corresponds to a virtual machine hosted on the server;
  the packet is a first packet;
  the FPGA includes a multiplexer operatively coupled to the NIC buffer and a outbound buffer configured to receive a second packet from the virtual machine via the NIC, the outbound multiplexer being configured to process input from the NIC and outbound buffers in a round-a-robin fashion; and
  the method further includes:
    upon receiving the second packet at the outbound buffer, processing the second packet in the outbound buffer to forward the second packet to the computer network; and
    decrementing the number of credits of the virtual port by an amount corresponding to a size of the processed second packet.

* * * * *